United States Patent [19]
Yamauchi et al.

[11] Patent Number: 6,073,992
[45] Date of Patent: Jun. 13, 2000

[54] BODY STRUCTURE FOR VEHICLES EMPLOYING FLOOR, ROOF, PILLAR AND SIDE SILL REINFORCEMENTS

[75] Inventors: Makoto Yamauchi, Hiroshima; Katsumi Ejima, Hiroshima-ken; Shuichi Nakagami, Higashihiroshima; Toshimitsu Kadoya, Hiroshima, all of Japan

[73] Assignee: Mazda Motor Corporation, Hiroshima-ken, Japan

[21] Appl. No.: 09/015,662

[22] Filed: Jan. 29, 1998

[30] Foreign Application Priority Data

Jan. 31, 1997 [JP] Japan ................................. 9-018807
Aug. 19, 1997 [JP] Japan ................................. 9-222502

[51] Int. Cl.$^7$ ........................................................ B60J 7/00
[52] U.S. Cl. ...................... 296/203.01; 296/188; 296/209
[58] Field of Search ............................... 296/29, 30, 187, 296/188, 203.01, 203.03, 205, 209

[56] References Cited

U.S. PATENT DOCUMENTS

| | | | |
|---|---|---|---|
| 2,389,907 | 11/1945 | Helmuth | 296/28 |
| 3,132,891 | 5/1964 | Pyuro et al. | 296/28 |
| 3,171,669 | 3/1965 | Barenyi | 280/106 |
| 3,776,589 | 12/1973 | Barenyi et al. | 296/28 |
| 4,311,744 | 1/1982 | Watanabe | 428/83 |
| 5,213,386 | 5/1993 | Janotik et al. | 296/29 |
| 5,242,209 | 9/1993 | Yamauchi | 296/188 |
| 5,246,264 | 9/1993 | Yoshii | 296/203 |
| 5,398,989 | 3/1995 | Winter et al. | 296/203 |
| 5,458,393 | 10/1995 | Benedyk | 296/203 |
| 5,782,525 | 7/1998 | Honma et al. | 296/188 |
| 5,820,204 | 10/1998 | Masadu et al. | 296/188 |
| 5,873,618 | 2/1999 | Ejima | 296/30 |

FOREIGN PATENT DOCUMENTS

| | | | |
|---|---|---|---|
| 40-4081371 | 3/1992 | Japan | 296/209 |
| 5-10167 | 2/1993 | Japan . | |

*Primary Examiner*—B. Dayoan
*Assistant Examiner*—Paul Chenevert
*Attorney, Agent, or Firm*—Nixon Peabody, LLP; Donald R. Studebaker

[57] ABSTRACT

The invention provides a body structure for vehicles which is capable of enhancing the passenger-protecting performance without much increasing the vehicle weight by enhancing the stiffness around the vehicle interior with high efficiency. A body roof is equipped with a closed-in-cross-section roof reinforcement extending widthwise of the vehicle body along a roof panel, right-and-left end portions of the roof reinforcement being coupled to upper end portions of a right-and-left pair of closed-in-cross-section center pillars extending in upper-and-lower direction in side portions of the vehicle body, respectively. Lower end portions of the center pillars are coupled to a pair of closed-in-cross-section side sills which extend longitudinally of the vehicle body to support right-and-left side edge portions of a floor panel, respectively, so that the roof reinforcement, the right-and-left center pillars and the right-and-left side sills form a continuous closed cross section with which an upper portion and right-and-left side portions of the vehicle interior, as viewed from the front of the vehicle, are covered.

13 Claims, 25 Drawing Sheets

BODY STRUCTURE FOR VEHICLES EMPLOYING FLOOR, ROOF, PILLAR AND SIDE SILL REINFORCEMENTS

BACKGROUND OF THE INVENTION

The present invention relates to a body structure for vehicles such as automobiles and, more particularly, to a body structure capable of effectively absorbing impact loads upon a collision of vehicles.

As is well known, the body structure for vehicles such as automobiles has been energetically improved and devised with the aim of enhancing the passenger-protecting performance at a collision of vehicles.

In recent years, particularly, it has been desired to enhance the passenger-protecting performance of a vehicle upon a collision sideways (so-called side collision) in addition to collisions in the front-and-rear directions of the vehicle, more intensely than it has been conventionally.

Conventionally, enhancement in the passenger-protecting performance at collisions of vehicles as mentioned above would generally be implemented by devising the individual frame members around the vehicle interior, their reinforcing members and the like.

For example, U.S. Pat. No. 5,242,209 (corresponding Japanese Application: Japanese Utility Model Laid-Open Publication No. 5-10167) discloses a structure showing the relationship among a reinforcing member for the center pillar, a reinforcing member for the side sill and cross members. Like this, with regard to structures of the so-called monocoque body, individual reinforcing members for the individual parts of the vehicle body are conventionally known.

However, as to how the passengers in the vehicle interior are effectively protected as a whole of the vehicle against various types of collisions (front collisions, rear collisions, side collisions or rollovers etc.), there have been proposed no concrete measures. Instead, structures provided for individual types of collisions are adopted independently for the individual parts. This would lead to a considerable increase in the weight of the whole vehicle.

On the other hand, there has been a desire that increase in the vehicle weight be suppressed as much as possible in terms of the maintenance and improvement of running performance, fuel performance and the like. With such measures as individual frame members and their reinforcement members as would be in the prior art, it has been quite hard to satisfy, at high level, both demands of the improvement in the passenger-protecting performance at collisions of vehicles and the suppression of increases in the vehicle weight.

Also, as the side sill of a closed-in-cross-section that constitutes the lower side part of an automobile body, there has conventionally been known one which is composed of a side sill outer and a side sill inner extending in the front-and-rear direction of the automobile body, and which is reinforced by a side sill reinforcement interposed between the side sill outer and the side sill inner (see Japanese Utility Model Laid-Open Publication HEI 6-6173).

However, the conventional side sill reinforcement would only be interveniently provided fragmentarily at appropriate places of the side sills in the front-and-rear direction of the body. Therefore, cross sectional deformation of the side sills due to side-collision loads cannot be effectively suppressed and, in particular, cross sectional deformation of the side sills due to offset-collision loads cannot be effectively suppressed, either, as problems.

Furthermore, there has been a problem that cross sectional deformation of the center pillar due to side-collision loads cannot be effectively suppressed.

SUMMARY OF THE INVENTION

Therefore, an object of the present invention is to provide a body structure for vehicles which is capable of enhancing the passenger-protecting performance without much increasing the vehicle weight by enhancing the stiffness around the vehicle interior with high efficiency, and also of effectively managing side collision loads.

Therefore, in an aspect of the present invention, there is provided a body structure for vehicles characterized in that a body roof is equipped with at least one closed-in-cross-section roof reinforcement extending widthwise of the vehicle body along a roof panel, right-and-left end portions of the roof reinforcement being coupled to upper end portions of a right-and-left pair of closed-in-cross-section pillar members extending in upper-and-lower direction in side portions of the vehicle body, respectively, and lower end portions of the pillar members are coupled to a pair of closed-in-cross-section side sills which extend longitudinally of the vehicle body to support right-and-left side edge portions of a floor panel, respectively, so that the roof reinforcement, the right-and-left pillar members and the right-and-left side sills form a continuous closed cross section with which an upper portion and right-and-left side portions of the vehicle interior, as viewed from the front of the vehicle, are covered.

According to the above mentioned aspect of the present invention, in addition to the advantage that the floor panel in lower part of the automobile interior is supported at its right-and-left side edge portions by the closed-in-cross-section side sills so as to have high stiffness, upper part and right-and-left side portions of the automobile interior, as the vehicle is viewed from the front, are covered with a continuous closed cross section. Therefore, the stiffness around the automobile interior, as the vehicle is viewed from the front, can be effectively enhanced without much increasing the weight of the vehicle body.

As a result, deformation of the automobile interior upon vehicle collisions, especially upon a side collision, can be effectively suppressed, so that protecting performance for passengers in the automobile interior can be further improved.

Also, in the above mentioned aspect of the present invention, it is preferable that a pair of closed-in-cross-section roof side rails extending longitudinally of the vehicle body are placed at right-and-left side edge portions of the roof panel to support the side edge portions, while the roof side rails, the side sills and the pillar members are each equipped with reinforcing members which extend longitudinally within a relevant closed cross-sectional space to partition the closed cross-sectional space, and wherein both right-and-left end sides of the roof reinforcement are coupled to the reinforcing members of the right-and-left roof side rails, respectively, while both upper-and-lower end sides of the reinforcing members of the pillar members are coupled to the reinforcing members of the roof side rails and the reinforcing members of the side sills, respectively, both the reinforcing members of the roof side rails and the reinforcing members of the side sills being provided so as to extend over a generally entire longitudinal length of the vehicle interior.

In this case, the same effects as in the above mentioned aspect of the invention can be produced, basically. Still moreover, a pair of closed-in-cross-section roof side rails extending longitudinally of the vehicle body are placed at right-and-left side edge portions of the roof panel to support the side edge portions, and both right-and-left end sides of the roof reinforcement are coupled to the reinforcing members of the right-and-left roof side rails, respectively. Therefore, an H-shaped (or U-shaped) reinforcing structure, as seen in plan view, can be made up in the roof part of the vehicle body by the right-and-left pair of roof side rails and the roof reinforcement. Further, since both upper-and-lower end sides of the reinforcing members of the pillar members are coupled to the reinforcing members of the roof side rails and the reinforcing members of the side sills, respectively, an H-shaped (or U-shaped) reinforcing structure, as seen in side view, can be made up also in the side portions of the vehicle body by the reinforcing members of the roof side rails, the side sills and the pillar members. As a result, the stiffness of the roof part and the side portions of the vehicle body can be further enhanced.

Yet, since both the reinforcing members of the roof side rails and the reinforcing members of the side sills are provided so as to extend over a generally entire longitudinal length of the vehicle interior, the reinforcing structure can be provided to the roof part and side portions of the vehicle body so as to extend over a generally entire longitudinal length of the vehicle interior. As a result, the stiffness around the vehicle interior can be further enhanced.

Further, in the above mentioned aspect of the present invention, it is preferable that the right-and-left end portions of the roof reinforcement are coupled to upper end sides of a right-and-left pair of closed-in-cross-section center pillars located between front-and-rear door openings provided at body sides and extending in upper-and-lower direction of the vehicle body, respectively.

In this case, the same effects as in the above mentioned aspects of the invention can be produced, basically. In particular, since the roof reinforcement couples upper end sides of the right-and-left center pillars to each other, an H-shaped reinforcing structure, as seen in plan view, can be made up in the roof part of the vehicle body by the right-and-left pair of roof side rails and the roof reinforcement, while an H-shaped reinforcing structure, as seen in side view, can be made up also in the side portions of the vehicle body by the roof side rails, the side sills and the pillar members. Thus, the stiffness of the roof part and side portions of the vehicle body can be further enhanced.

Yet in this case, since the passengers' heads will normally not be located at the center pillar positions in the longitudinal direction of the vehicle, the roof reinforcement can be provided without adversely affecting the head clearance of passengers, i.e., without impairing the roominess of the vehicle interior.

Further, in the above mentioned aspect of the present invention, it is preferable that right-and-left end portions of the roof reinforcement are coupled to upper end sides of a right-and-left pair of closed-in-cross-section front pillars extending in upper-and-lower direction along a front edge of the front-side door opening.

In this case, the same effects as in the above mentioned aspects of the invention can be produced, basically. In particular, since the roof reinforcement couples upper end sides of the right-and-left center pillars to each other, upper part and right-and-left side portions of the automobile interior, as the vehicle is viewed from the front, are covered with a continuous closed cross section. Therefore, the stiffness around the automobile interior, as the vehicle is viewed from the front, can be effectively enhanced without much increasing the weight of the vehicle body.

Further, in the above mentioned aspect of the present invention, it is preferable that a plurality of the roof reinforcements are provided, wherein right-and-left end portions of each roof reinforcement are coupled to upper end sides of the right-and-left pair of closed-in-cross-section center pillars which are located between the front-and-rear door openings provided at body sides and which extend in upper-and lower direction, or to upper end sides of a right-and-left pair of closed-in-cross-section front pillars extending in upper-and-lower direction along a front edge of the front-side door opening.

In this case, the same effects as in the above mentioned aspects of the invention can be produced, basically. In particular, since a plurality of the roof reinforcements are provided, the stiffness of the roof part of the vehicle body can be further enhanced and the coupling strength between the right-and-left side portions of the vehicle body can be further enhanced. Thus, the stiffness around the vehicle interior can be further improved.

Also, in this case, in particular, each roof reinforcement couples upper end sides of the right-and-left center pillars to each other, or upper end portions of the front pillars to each other. Because passengers' heads will normally not be located at these pillar positions longitudinally of the vehicle body, the roof reinforcements can be provided in some plural number without adversely affecting the head clearance of the passengers, i.e. without impairing the roominess of the vehicle interior.

Further, in the above mentioned aspect of the present invention, it is preferable that a closed-in-cross-section cross member extending widthwise of the vehicle body and coupling the right-and-left side sills to each other is provided in lower part of the vehicle interior.

In this case, the same effects as in the above mentioned aspects of the invention can be produced, basically. Still moreover, a closed-in-cross-section cross member extending widthwise of the vehicle body and coupling the right-and-left side sills to each other is provided in lower part of the vehicle interior. Therefore, an H-shaped (or U-shaped) reinforcing structure, as seen in plan view, can be made up in the floor part of the vehicle body by the right-and-left pair of side sills and the cross member. Thus, the stiffness of the floor part of the vehicle body can be further enhanced so that the stiffness around the vehicle interior can be further improved.

Further, in the above mentioned aspect of the present invention, it is preferable that a plurality of the cross members are provided, wherein right-and-left end portions of each cross member are coupled to the reinforcing members of the side sills, respectively.

In this case, the same effects as in the above mentioned aspects of the invention can be produced, basically. In particular, since a plurality of cross members are provided, the stiffness of the floor part of the vehicle body as well as the coupling strength between the right-and-left side portions of the vehicle body can be further enhanced, so that the stiffness around the vehicle interior can be further improved.

Further, in the above mentioned aspect of the present invention, it is preferable that each of the cross members are provided on the floor panel of the vehicle interior, and a front seat or a rear seat is arranged above each of the cross members.

In this case, the same effects as in the above mentioned aspects of the invention can be produced, basically. In particular, since a plurality of cross members are provided, the stiffness of the floor part of the vehicle body as well as the coupling strength between the right-and-left side portions of the vehicle body can be further enhanced, so that the stiffness around the vehicle interior can be further improved.

Also, in this case, since each cross member is placed below the front seat or the rear seat, the cross member will never adversely affect the assurance of the underfoot space for the passengers seated in the front seat or rear seat. That is, a plurality of cross members that reinforce the floor part can be provided without impairing the roominess of the vehicle interior.

Further, in the above mentioned aspect of the present invention, it is preferable that a segment member extending widthwise of the vehicle body and lapping on the side end portion of the cross member is provided within the side sill.

In this case, the same effects as in the above mentioned aspects of the invention can be produced, basically. In particular, a segment member extending widthwise of the vehicle body and lapping on the side end portion of the cross member is provided within the side sill, more preferably, on the outer side of the cross member where the first side sill reinforcement and the widthwise side end portion of the vehicle body lap on each other. Therefore, cross-sectional deformation of the side sills can be effectively suppressed with segment members of simple construction, and any side collision load can be transferred directly to the cross members of strength.

Further, in the above mentioned aspect of the present invention, it is preferable that the reinforcing members of the roof side rails and the reinforcing members of the side sills are set longer in front-side portion extending forward from the joint part with the center pillar than in rear-side portion extending rearward from the joint part with the center pillar.

In this case, the same effects as in the above aspects of the inventin can be produced, basically. In particular, the reinforcing members of the roof side rails and the reinforcing members of the side sills are set longer in front-side portion of the coupled part with the center pillars than in rear-side portion of the coupled part with the center pillars.

That is, the front doors of the vehicle are supported by hinge on the front pillars and, during the closure of the doors, engaged with the center pillars, while the rear doors are supported by hinge on the center pillars. Therefore, when a collision load is inputted sideways to the center pillars or their proximities upon a side collision, the resulting door inrush amount (quantity of deformation) toward the vehicle interior would normally become greater in the front doors, which have a pivotal center of opening and closing of doors on the front pillar side than in the rear doors, which have a pivotal center of opening and closing of doors on the center pillar side. However, by adopting the above constitution for the reinforcing members of the roof side rails and the reinforcing members of the side sills, deformation of the front doors toward the vehicle interior can be suppressed, compared with the rear doors, so that the inrush amount of the front-and-rear doors toward the vehicle interior can be balanced, thus allowing an efficient reinforcement to be attained.

Further, in the above mentioned aspect of the present invention, it is preferable that a side sill reinforcement extending longitudinally of a vehicle body is placed within a closed-in-cross-section side sill, while a front end portion of the side sill reinforcement is joined to a lower end portion of a front pillar and a rear portion of the side sill reinforcement is lapped on a side end portion of the cross member.

In this case, the same effects as in the above aspects of the inventin can be produced, basically. In particular, any side collision load can be supported at three points of the front pillars, the center pillars and the cross member of strength by taking advantage of the first side sill reinforcement. Therefore, cross-sectional deformation of the side sills can be effectively suppressed.

Further, in the above mentioned aspect of the present invention, it is preferable that a roof side rail reinforcement extending longitudinally of a vehicle body is placed within a closed-in-cross-section roof side rail, and a front end portion of the roof side rail reinforcement is joined to a upper end portion of a front pillar, while a rear end portion of the roof side reinforcement is located at a position apart a distance from an upper end portion of the rear pillar.

In this case, the same effects as in the above aspects of the invention can be produced, basically. In particular, since the front end portion of the roof side rail reinforcement is jointed to the upper end portion of the front pillar, the stiffness of the roof side rail and the front pillar can be further enhanced. Also, since the roof side rail renforcement is jointed to the pillar member only at front end side, the stiffness of the vehicle interior in its front-side is further enhanced, without much increase in the weight of side rail reinforcement, in comparison with in its rear-side.

Further, in the above mentioned aspect of the present invention, it is preferable that a plurality of side sill reinforcements are provided, wherein a front end portion of the first side sill reinforcement is joined to a lower end portion of a front hinge pillar and a rear portion of the first side sill reinforcement is lapped on a side end portion of a cross member extending widthwise of the vehicle body behind a center pillar, while a front end portion of the second side sill reinforcement is joined to the lower end portion of the front hinge pillar, while a rear end portion of the second side sill reinforcement extends at least to the side end portion of the cross member extending widthwise of the vehicle body in front of the center pillar.

In this case, the same effects as in the above aspects of the invention can be produced, basically. In particular, any side collision load can be supported at three points of the front pillars, the center pillars and the cross member of strength by taking advantage of the first side sill reinforcement. Therefore, cross-sectional deformation of the side sills can be effectively suppressed.

Especially, a front end portion of the second side sill reinforcement placed within the side sill is joined to the lower end portion of the front hinge pillar, while a rear end portion of the second side sill reinforcement extends to the side end portion of the cross member. Therefore, in particular, any offset collision load can be effectively supported at the two points of the front pillars and the cross member of strength also by making use of the second side sill reinforcement.

Further, in the above mentioned aspect of the present invention, it is preferable that the first side sill reinforcement is arranged on the outer side in the side sill, and the second side sill reinforcement is arranged on the inner side in the side sill.

In this case, the same effects as in the above aspects of the invention can be produced, basically. In particular, since the first side sill reinforcement is a reinforcement for a side sill outer, any side collision load can be dispersedly transferred directly to the front pillars, the center pillars and the cross member.

Also, a front end portion of the second side sill reinforcement placed within the side sill is joined to the lower end portion of the front hinge pillar, while a rear end portion of the second side sill reinforcement extends to the side end portion of the cross member. Therefore, in particular, any offset collision load can be effectively supported at the two points of the front pillars and the cross member of strength also by making use of the second side sill reinforcement.

Further, in the above mentioned aspect of the present invention, it is preferable that the right-and-left end portions of the roof reinforcement and the upper end portions of the center pillars are coupled to each other, respectively, via a coupling gusset which is installed so as to stretch from inside of the vehicle interior over the coupling portions between the right-and-left end portions of the roof reinforcement and the upper end portions of the center pillars.

In this case, same effects as in the above mentioned aspects of the invention can be produced, basically. In particular, by using the coupling gusset, the right-and-left end portions of the roof reinforcement and the upper end portions of the center pillars can be coupled to each other so that their closed cross sections adjoin with reliability. Also, the stiffness of the coupling portion can be assured.

Further, in the above mentioned aspect of the present invention, it is preferable that the center pillars are each equipped with a plurality of reinforcing members, and wherein a first reinforcing member is provided to couple the roof side rail reinforcement and the side sill reinforcement, while a second reinforcing member is provided in a region including a site corresponding to a boundary between a door itself and a door glass opening, and which serves to relax stress concentration at the site corresponding to the boundary when a load is inputted to the center pillars via a door.

In this case, the same effects as in the above mentioned aspects of the invention can be produced, basically. Still moreover, the center pillars are equipped with the reinforcing means. Therefore, it becomes possible to effectively relax the concentration of stress that occurs at a site corresponding to the boundary between the thick doors themselves formed of steel plate and the door glass openings when a collision load is inputted to the center pillars via the doors.

Further, in the above mentioned aspect of the present invention, it is preferable that the second reinforcing member is constituted so that the stiffness of a portion thereof corresponding to the door glass opening is reduced gradually in upper direction.

In this case, it becomes possible to further effectively relax the concentration of stress that occurs at a site corresponding to the boundary between the thick doors themselves formed of steel plate and the door glass openings when a collision load is inputted to the center pillars via the doors.

Further, in the above mentioned aspect of the present invention, it is preferable that lower portion of the center pillar reinforcement of the center pillar is formed so as to be widespread longitudinally of the vehicle body, the widespread portion being joined to both the side sill outer and the reinforcement on the side sill outer side, and wherein lower portion of the center pillar inner is bent outward, a bent end portion thereof being joined to a joint portion between the side sill outer, the reinforcement on the side sill outer side and the center pillar reinforcement, and the bent portion being joined to the side sill inner.

In this case, the same effects as in the above mentioned aspects of the invention can be produced, basically. Still moreover, the widespread portion of lower part of the center pillar reinforcement is joined to both the side sill outer and the reinforcement on the side sill outer side, the bent end portion of the center pillar inner is joined to the joint portion between the side sill outer, the reinforcement on the side sill outer side and the center pillar reinforcement, and the bent portion is joined to the side sill inner. Therefore, any side collision load of the center pillars can be dispersedly transferred directly to the side sill outer, the side-sill-outer reinforcement and the side sill inner by making use of the center pillar reinforcement and the center pillar inner. Thus, cross-sectional deformation of the center pillars can be effectively suppressed.

Further, in another aspect of the present invention, there is provided a body structure for vehicles characterized in that a body roof is equipped with a plurality of closed-in-cross-section roof reinforcement extending widthwise of the vehicle body along a roof panel, right-and-left end portions of a first roof reinforcement being coupled to upper end portions of a right-and-left pair of closed-in-cross-section center pillars located between front-and-rear door openings provided at body sides and extending vertically, and a second roof reinforcement being coupled to upper end portions of a right-and-left pair of closed-in-cross-section front pillars extending vertically along a front edge of the front door opening, while lower end portions of the front pillars and the center pillars are coupled to a pair of closed-in-cross-section side sills which extend longitudinally of the vehicle body to support right-and-left side edge portions of a floor panel, and a pair of closed-in-cross-section roof side rails extending longitudinally of the vehicle body are placed at right-and-left side edge portions of the roof panel to support the side edge portions, wherein the roof side rails, the side sills and the pillar members are each equipped with reinforcing members which extend longitudinally within a relevant closed cross-sectional space to partition the closed cross-sectional space, and wherein a closed-in-cross-section cross member extending widthwise of the vehicle body and coupling the right-and-left side sills to each other is provided in lower part of the vehicle interior.

In this case, since a plurality of the roof reinforcements are provided, the stiffness of the roof part of the vehicle body can be further enhanced and the coupling strength between the right-and-left side portions of the vehicle body can be further enhanced. Thus, the stiffness around the vehicle interior can be further improved.

Also, in this case, in particular, each roof reinforcement couples upper end sides of the right-and-left center pillars to each other, or upper end portions of the front pillars to each other. Because passengers' heads will normally not be located at these pillar positions longitudinally of the vehicle body, the roof reinforcements can be provided in some plural number without adversely affecting the head clearance of the passengers, i.e. without impairing the roominess of the vehicle interior.

Further, in this case, a closed-in-cross-section cross member extending widthwise of the vehicle body and coupling the right-and-left side sills to each other is provided in lower part of the vehicle interior. Therefore, an H-shaped (or U-shaped) reinforcing structure, as seen in plan view, can be made up in the floor part of the vehicle body by the right-and-left pair of side sills and the cross member. Thus, the stiffness of the floor part of the vehicle body can be further enhanced so that the stiffness around the vehicle body can be further improved.

Further, in the above mentioned aspect of the present invention, it is preferable that a plurality of the cross members are provided, wherein right-and-left end portions of each cross member are coupled to the reinforcing members of the side sills, respectively.

In this case, the same effects as in the above mentioned aspects of the invention can be produced, basically. In particular, since a plurality of cross members are provided, the stiffness of the floor part of the vehicle body as well as the coupling strength between the right-and-left side portions of the vehicle body can be further enhanced, so that the stiffness around the vehicle interior can be further improved.

Further, in the above mentioned aspect of the present invention, it is preferable that each of the cross members is provided on the floor panel of the vehicle interior, and a front seat or a rear seat is arranged above each of the cross member.

In this case, the same effects as in the above mentioned aspects of the invention can be produced, basically. In particular, since a plurality of cross members are provided, the stiffness of the floor part of the vehicle body as well as the coupling strength between the right-and-left side portions of the vehicle body can be further enhanced, so that the stiffness around the vehicle interior can be further improved.

Also, in this case, since each cross member is placed below the front seat or the rear seat, the cross member will never adversely affect the assurance of the underfoot space for the passengers seated in the front seat or rear seat. That is, a plurality of cross members that reinforce the floor part can be provided without impairing the roominess of the vehicle interior.

Further, in the above mentioned aspect of the present invention, it is preferable that a segment member extending widthwise of the vehicle body and lapping on the side end portion of the cross member is provided within the side sill.

In this case, the same effects as in the above mentioned aspects of the invention can be produced, basically. In particular, a segment member extending widthwise of the vehicle body and lapping on the side end portion of the cross member is provided within the side sill, more preferably on the outer side of the cross member where the first side sill reinforcement and the widthwise side end portion of the vehicle body lap on each other. Therefore, cross-sectional deformation of the side sills can be effectively suppressed with segment members of simple construction, and any side collision load can be transferred directly to the cross members of strength.

Further, in another aspect of the present invention, there is provided a body structure for vehicles characterized in that a body roof is equipped with a plurality of closed-in-cross-section roof reinforcement extending widthwise of the vehicle body along a roof panel, right-and-left end portions of a first roof reinforcement being coupled to upper end portions of a right-and-left pair of closed-in-cross-section center pillars located between front-and-rear door openings provided at body sides and extending vertically, and a second roof reinforcement being coupled to upper end portions of a right-and-left pair of closed-in-cross-section front pillars extending vertically along a front edge of the front door opening, while lower end portions of the front pillars and the center pillars are coupled to a pair of closed-in-cross-section side sills which extend longitudinally of the vehicle body to support right-and-left side edge portions of a floor panel, and a pair of closed-in-cross-section roof side rails extending longitudinally of the vehicle body are placed at right-and-left side edge portions of the roof panel to support the side edge portions, wherein the roof side rails, the side sills and the pillar members are each equipped with reinforcing members which extend longitudinally within a relevant closed cross-sectional space to partition the closed cross-sectional space, and wherein the reinforcing members of the roof side rails and the reinforcing members of the side sills are set longer in front-side portion extending forward from the joint part with the center pillar than in rear-side portion extending rearward from the joint part with the center pillar.

In this case, since a plurality of the roof reinforcements are provided, the stiffness of the roof part of the vehicle body can be further enhanced and the coupling strength between the right-and-left side portions of the vehicle body can be further enhanced. Thus, the stiffness around the vehicle interior can be further improved.

Also, in this case, in particular, each roof reinforcement couples upper end sides of the right-and-left center pillars to each other, or upper end portions of the front pillars to each other. Because passengers' heads will normally not be located at these pillar positions longitudinally of the vehicle body, the roof reinforcements can be provided in some plural number without adversely affecting the head clearance of the passengers, i.e. without impairing the roominess of the vehicle interior.

Further, in this case, the reinforcing members of the roof side rails and the reinforcing members of the side sills are set longer in front-side portion of the coupled part with the center pillars than in rear-side portion of the coupled part with the center pillars.

That is, the front doors of the vehicle are supported by hinge on the front pillars and, during the closure of the doors, engaged with the center pillars, while the rear doors are supported by hinge on the center pillars. Therefore, when a collision load is inputted sideways to the center pillars or their proximities upon a side collision, the resulting door inrush amount (quantity of deformation) toward the vehicle interior would normally become greater in the front doors, which have a pivotal center of opening and closing of doors on the front pillar side than in the rear doors, which have a pivotal center of opening and closing of doors on the center pillar side. However, by adopting the above constitution for the reinforcing members of the roof side rails and the reinforcing members of the side sills, deformation of the front doors toward the vehicle interior can be suppressed, compared with the rear doors, so that the inrush amount of the front-and-rear doors toward the vehicle interior can be balanced, thus allowing an efficient reinforcement to be attained.

Further, in the above mentioned aspect of the present invention, it is preferable that a side sill reinforcement extending longitudinally of a vehicle body is placed within a closed-in-cross-section side sill, while a front end portion of the side sill reinforcement is joined to a lower end portion of a front pillar and a rear portion of the side sill reinforcement is lapped on a side end portion of the cross member.

In this case, the same effects as in the above aspect of the invention can be produced, basically. In particular, any side collision load can be supported at three points of the front pillars, the center pillars and the cross member of strength by taking advantage of the first side sill reinforcement. Therefore, cross-sectional deformation of the side sills can be effectively suppressed.

Further, in the above mentioned aspect of the present invention, it is preferable that a roof side rail reinforcement extending longitudinally of a vehicle body is placed within a closed-in-cross-section roof side rail, and a front end portion of the roof side rail reinforcement is joined to a upper end portion of a front pillar, while a rear portion of the roof side rail reinforcement is located at a position apart a distance from a upper portion of the rear pillar.

In this case, the same effects as in the above aspects of the invention can be produced, basically. In particular, since the front end portion of the roof side rail reinforcement is joined to the upper end portion of the front pillar, the stiffness of the roof side rail and the front pillar can be further enhanced. Also, since the roof side rail renforcement is jointed to the pillar member only at front end side, the stiffness of the vehicle interior in its front-side is further enhanced, without much increase in the weight of side rail reinforcement, in comparison with in its rear-side.

Further, in the above mentioned aspect of the present invention, it is preferable that a plurality of side sill reinforcements are provided, wherein a front end portion of the first side sill reinforcement is joined to a lower end portion of a front hinge pillar and a rear portion of the first side sill reinforcement is lapped on a side end portion of a cross member extending widthwise of the vehicle body behind a center pillar, while a front end portion of the second side sill reinforcement is joined to the lower end portion of the front hinge pillar, while a rear end portion of the second side sill reinforcement extends at least to the side end portion of the cross member extending widthwise of the vehicle body in front of the center pillar.

In this case, the same effects as in the above aspects of the invention can be produced, basically. In particular, any side collision load can be supported at three points of the front pillars, the center pillars and the cross member of strength by taking advantage of the first side sill reinforcement. Therefore, cross-sectional deformation of the side sills can be effectively suppressed.

Especially, a front end portion of the second side sill reinforcement placed within the side sill is joined to the lower end portion of the front hinge pillar, while a rear end portion of the second side sill reinforcement extends to the side end portion of the cross member. Therefore, in particular, any offset collision load can be effectively supported at the two points of the front pillars and the cross member of strength also by making use of the second side sill reinforcement.

Further, in the above mentioned aspect of the present invention, it is preferable that the first side sill reinforcement is arranged on the outer side in the side sill, and the second side sill reinforcement is arranged on the inner side in the side sill.

In this case, the same effects as in the above aspects of the invention can be produced, basically. In particular, since the first side sill reinforcement is a reinforcement for a side sill outer, any side collision load can be dispersedly transferred directly to the front pillars, the center pillars and the cross member.

Also, a front end portion of the second side sill reinforcement placed within the side sill is joined to the lower end portion of the front hinge pillar, while a rear end portion of the second side sill reinforcement extends to the side end portion of the cross member. Therefore, in particular, any offset collision load can be effectively supported at the two points of the front pillars and the cross member of strength also by making use of the second side sill reinforcement.

Further, in another aspect of the present invention, there is provided a body structure for vehicles characterized in that a body roof is equipped with a plurality of closed-in-cross-section roof reinforcements extending widthwise of the vehicle body along a roof panel, right-and-left end portions of a first roof reinforcement being coupled to upper end portions of a right-and-left pair of closed-in-cross-section center pillars located between front-and-rear door openings provided at body sides and extending vertically, and a second roof reinforcement being coupled to upper end portions of a right-and-left pair of closed-in-cross-section front pillars extending vertically along a front edge of the front door opening, while lower end portions of the front pillars and the center pillars are coupled to a pair of closed-in-cross-section side sills which extend longitudinally of the vehicle body to support right-and-left side edge portions of a floor panel, and a pair of closed-in-cross-section roof side rails extending longitudinally of the vehicle body are placed at right-and-left side edge portions of the roof panel to support the side edge portions, wherein the roof side rails, the side sills and the pillar members are each equipped with reinforcing members which extend longitudinally within a relevant closed cross-sectional space to partition the closed cross-sectional space, and wherein the right-and-left end portions of the roof reinforcement and the upper end portions of the center pillars are coupled to each other, respectively, via a coupling gusset which is installed so as to stretch from inside of the vehicle interior over the coupling portions between the right-and-left end portions of the roof reinforcement and the upper end portions of the center pillars, while the center pillars are each equipped with a plurality of reinforcing members, and wherein a first reinforcing member is provided to couple the roof side rail reinforcement and the side sill reinforcement, while a second reinforcing member is provided in a region including a site corresponding to a boundary between door itself and door glass opening, and which serves to relax stress concentration at the site corresponding to the boundary when a load is inputted to the center pillars via a door.

In this case, since a plurality of the roof reinforcements are provided, the stiffness of the roof part of the vehicle body can be further enhanced and the coupling strength between the right-and-left side portions of the vehicle body can be further enhanced. Thus, the stiffness around the vehicle interior can be further improved.

Also, in this case, in particular, each roof reinforcement couples upper end sides of the right-and-left center pillars to each other, or upper end portions of the front pillars to each other. Because passengers' heads will normally not be located at these pillar positions longitudinally of the vehicle body, the roof reinforcements can be provided in some plural number without adversely affecting the head clearance of the passengers, i.e. without impairing the roominess of the vehicle interior.

Further, in this case, by using the coupling gusset, the right-and-left end portions of the roof reinforcement and the upper end portions of the center pillars can be coupled to each other so that their closed cross sections adjoin with reliability. Also, the stiffness of the coupling portion can be assured.

Also, in this case, the center pillars are equipped with the reinforcing means. Therefore, it becomes possible to effectively relax the concentration of stress that occurs at a site corresponding to the boundary between the thick doors themselves formed of steel plate and the door glass openings when a collision load is inputted to the center pillars via the doors.

Further, in the above mentioned aspect of the present invention, it is preferable that the second reinforcing member is constituted so that the stiffness of a portion thereof corresponding to the door glass opening is reduced gradually in upper direction.

In this case, it becomes possible to further effectively relax the concentration of stress that occurs at a site corresponding to the boundary between the thick doors themselves formed of steel plate and the door glass openings when a collision load is inputted to the center pillars via the doors.

DETAILED DESCRIPTION OF THE PREFERRED EMBODIMENTS

Now an embodiment of the present invention is described below in detail with reference to the accompanying drawings.

First described is the basic frame structure around the vehicle interior of a vehicle (automobile) according to this embodiment.

Figure 1:
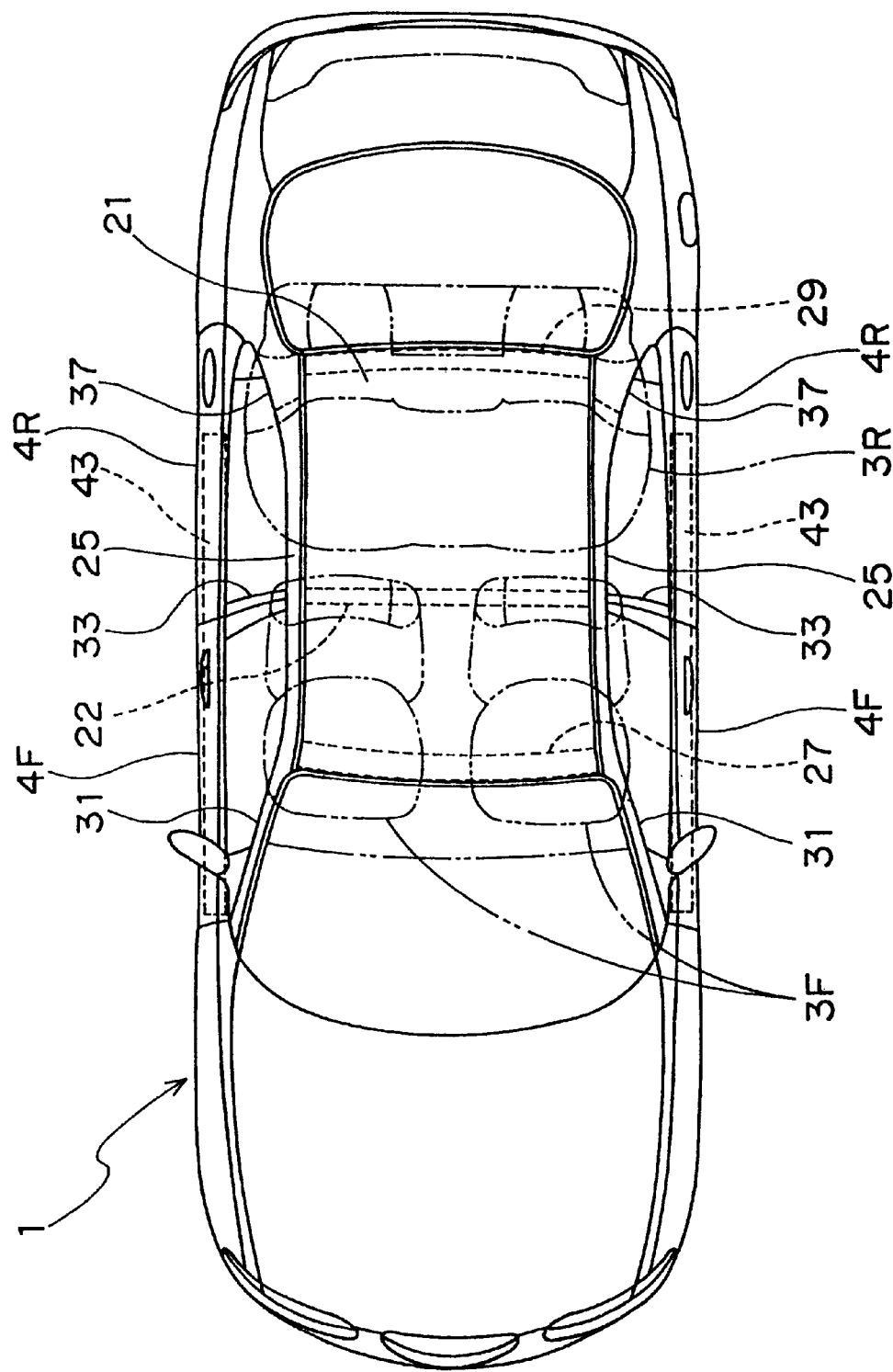
FIG. 1 is an explanatory plan view of an automobile according to an embodiment of the present invention.
Figure 2:
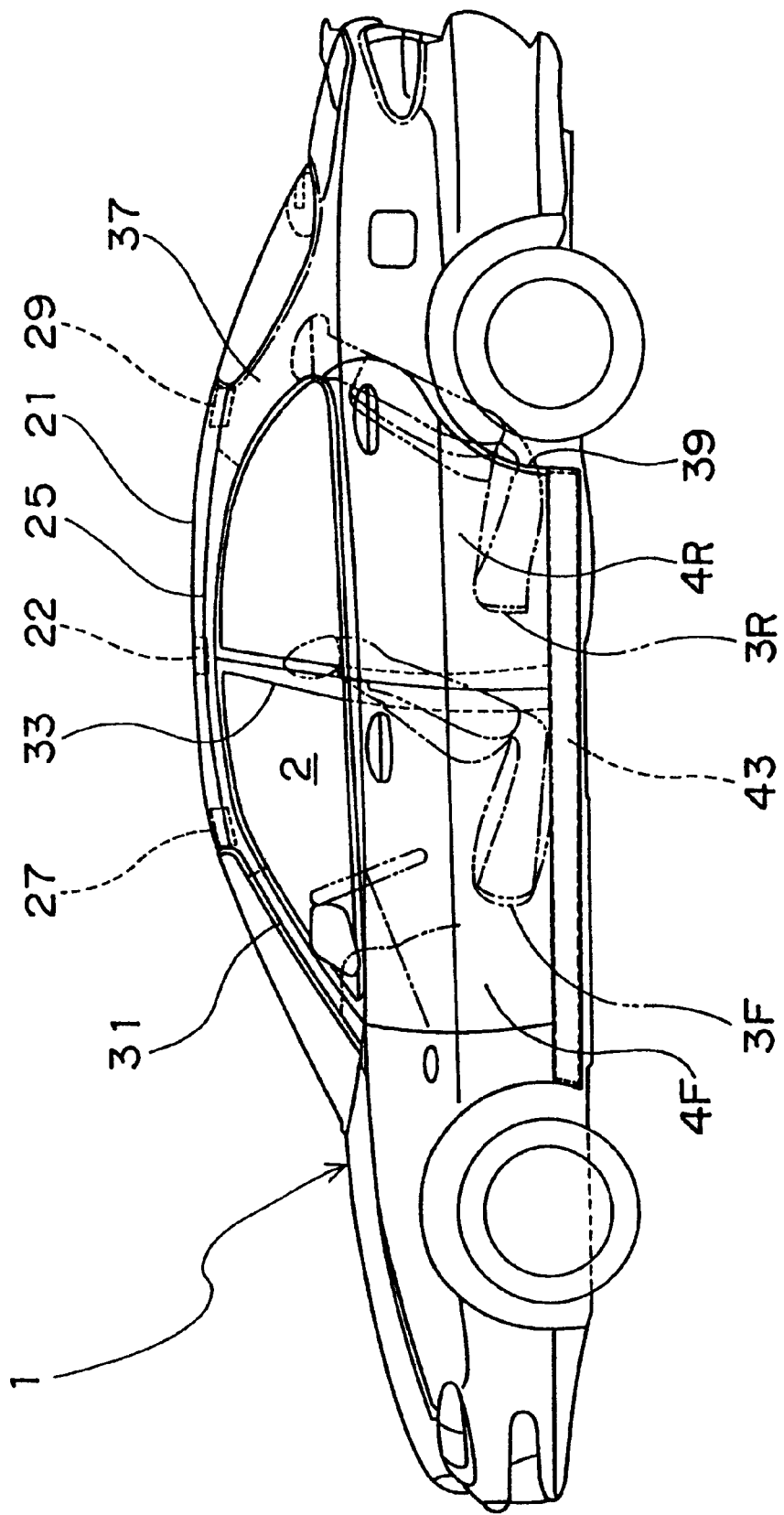
FIG. 2 is an explanatory side view of the automobile.
Figure 3:
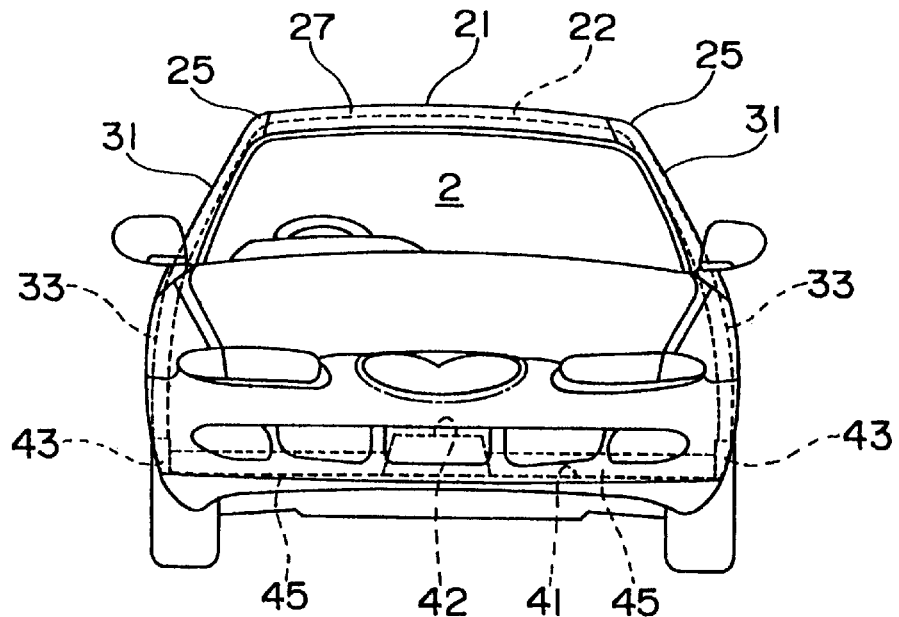
FIG. 3 is an explanatory front view of the automobile.
Figure 4:
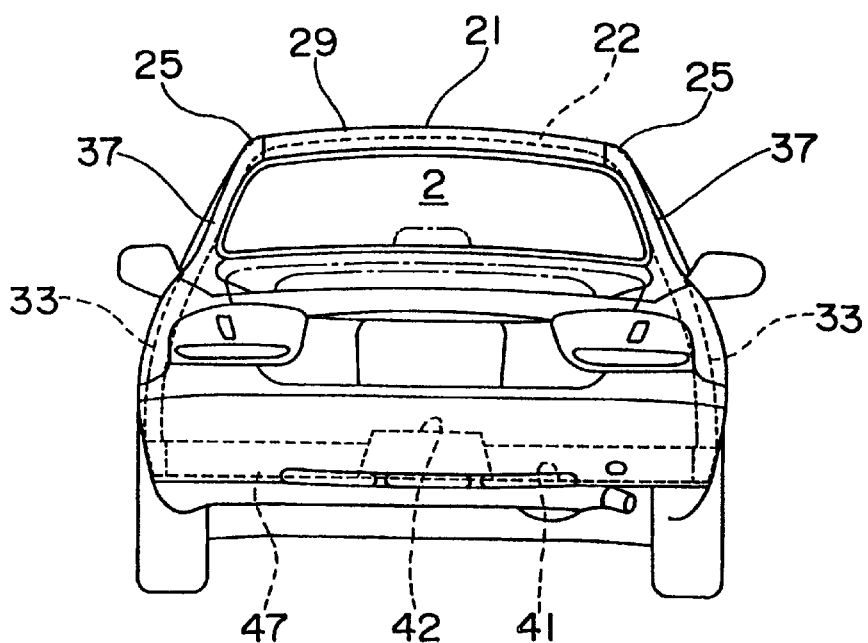
FIG. 4 is an explanatory rear view of the automobile.
Figure 5:
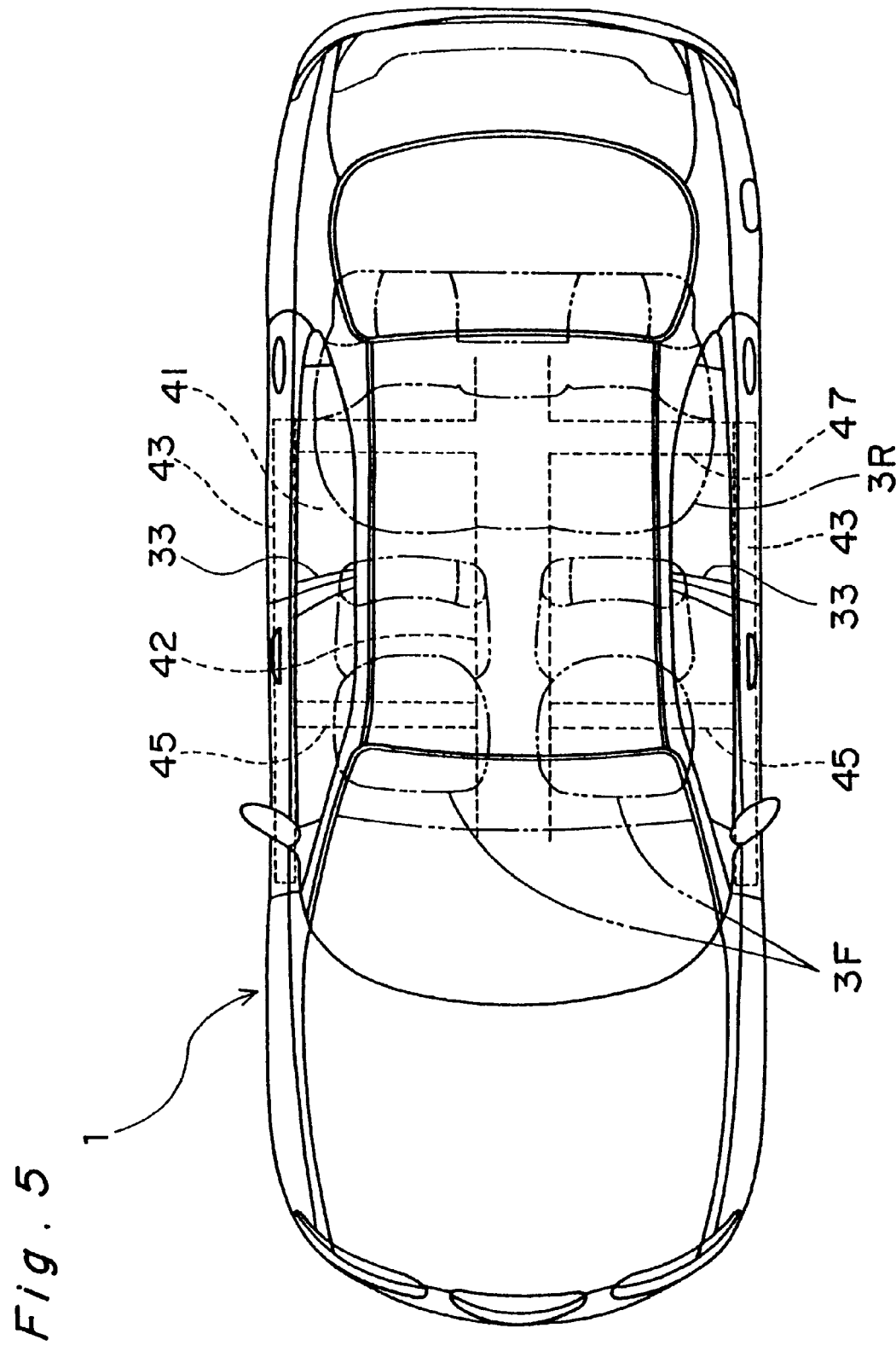
FIG. 5 is an explanatory plan view showing the frame structure of the floor part of the automobile.

FIGS. 1 through 4 are an explanatory plan view, an explanatory side view, an explanatory front view and an explanatory rear view, respectively, of an automobile 1 according to this embodiment. FIG. 5 is an explanatory plan view showing the frame structure of the floor part of the automobile 1.

As shown in these figures, the automobile 1 is equipped with a pair of roof side rails 25 which extend longitudinally of the car body to support right-and-left side edge portions of a roof panel 21, and a front header 27 and a rear header 29 which couple front ends of the right-and-left roof side rails 25 (i.e., upper ends of later-described front pillars 31) to each other and their rear ends (i.e., upper ends of later-described rear pillars 37) to each other, respectively, and which extend widthwise of the car body, as frame members that constitute the frame of the roof part of an automobile interior 2.

In this embodiment, in addition to the frame members 25, 27 and 29, the roof part of the automobile interior 2 is equipped with a closed-in-cross-section roof reinforcement 22 extending widthwise of the car body along the roof panel 21 as will be detailed later.

The roof side rails 25, the front header 27 and the rear header 29 are each formed so as to have a closed cross-sectional space of a specified shape, by joining edge portions of press-molded outer panel and inner panel to each other. In this embodiment, the front header 27 has a cross section formed in such a way that its closed cross-sectional space becomes particularly large with a view to ensuring higher stiffness so that the frame structure of the roof is thereby reinforced.

Figure 11:
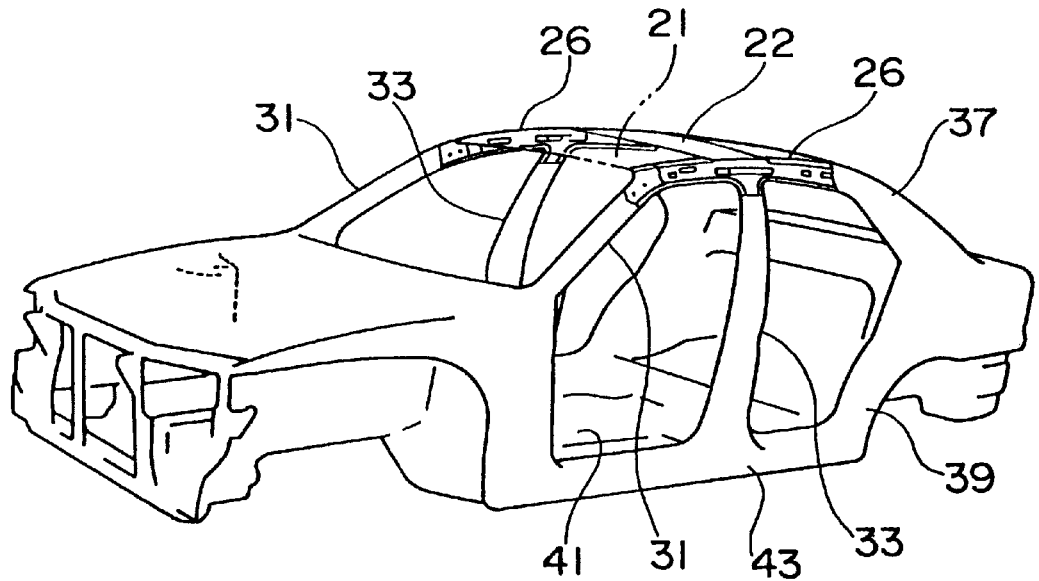
FIG. 11 is a perspective view showing the reinforcing member of the roof part of the automobile.
Figure 13:
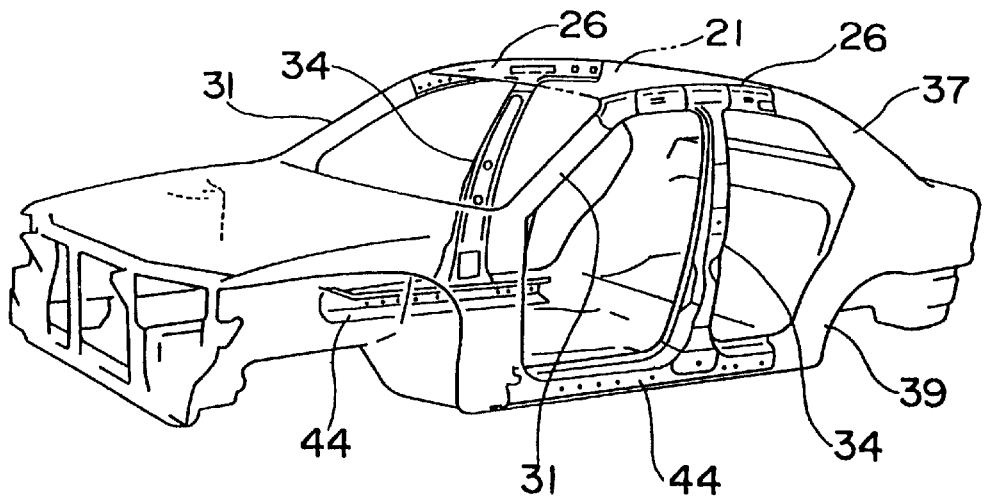
FIG. 13 is a perspective view showing the reinforcing member of the body side part of the automobile.
Figure 14:
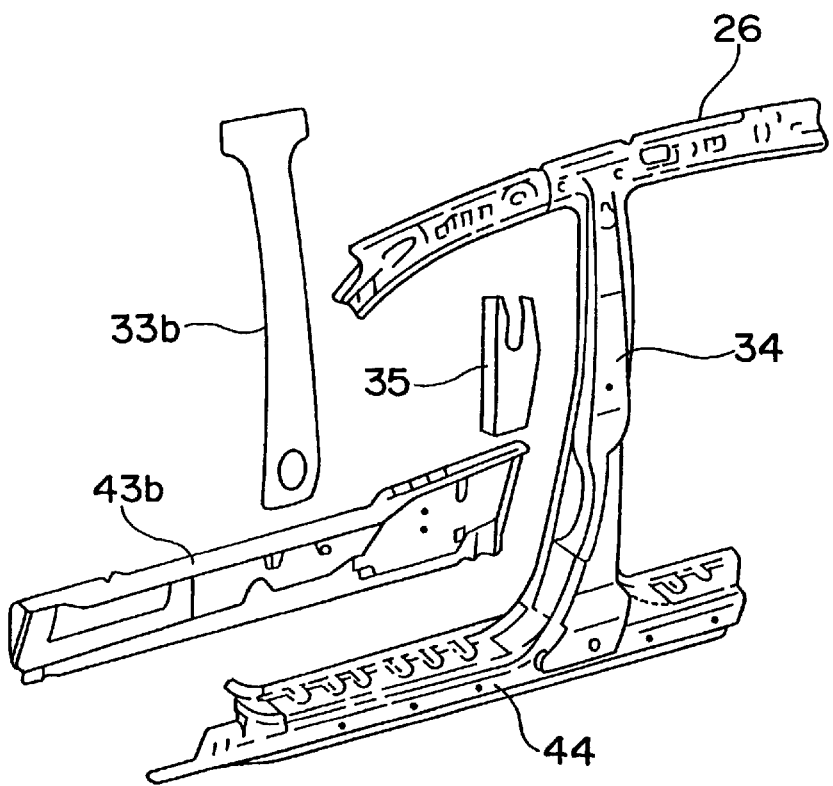
FIG. 14 is a enlarged perspective view showing the reinforcing member of the body side part.

As shown in FIGS. 11, 13 and 14, the roof side rails 25 are each equipped with a reinforcing member (roof side reinforcement) 26 extending longitudinally within its closed cross-sectional space and partitioning the closed cross-sectional space. This roof side reinforcement 26 is provided so as to extend over a generally entire longitudinal length of the automobile interior 2. The front end portion of each roof side reinforcement 26 is jointed to an upper end portion of a later-described front pillar 31, while the rear end portion of each roof side reinforcement 26 is jointed to an inner panel of the roof side rail at the position apart a distance from an upper end portion of a later-described rear pillar 37. That is, the rear end portion of each roof side reinforcement 26 is not jointed to the upper end portion of the rear pillar 37. While, as will be detailed later, the roof side reinforcement 26 is joined to upper ends of the roof reinforcement 22 and a later-described center pillar reinforcement 34 of the center pillar 33. Also, the roof side reinforcement 26 is set longer in front-side portion extending forward from the joint part with the center pillar 33 than in rear-side portion extending rearward from the joint part with the center pillar 33.

The roof panel 21 forming the roof part of the automobile interior 2 is supported at its side edge portion, front edge portion and rear edge portion by the right-and-left roof side rails 25, the front header 27 and the rear header 29, respectively. Besides, longitudinally intermediate portion of the roof panel 21 is reinforced by the roof reinforcement 22.

In this automobile 1, a right-and-left pair of front pillars 31 extending in upper-and-lower direction along the front edges of openings of front doors 4F, a right-and-left pair of rear pillars 37 extending in upper-and-lower direction along the rear edges of openings of rear doors 4R, and a right-and-left pair of center pillars 33 located between the front and rear door openings and extending in upper-and-lower direction of the vehicle body are also provided as frame members constituting the frame of side parts of the automobile interior 2.

Upper ends of the right-and-left front pillars 31 are coupled to each other by the front header 27, while upper ends of the right-and-left rear pillars 37 are coupled to each other by the rear header 29. Upper ends of the center pillars 33 are coupled to end portions of the roof reinforcement 22 via the roof side rails 25, while their lower ends are coupled to later-described side sills 43 of the floor part.

The front pillars 31, the rear pillars 37 and the center pillars 33 are so formed as to have a closed cross-sectional space of a specified shape by joining edge portions of press molded outer panel and inner panel to each other.

As shown in FIGS. 13 and 14, the center pillars 33 are each equipped with a center pillar reinforcement 34 extending longitudinally within the closed cross-sectional space and partitioning the closed cross-sectional space. This center pillar reinforcement 34 is coupled at its upper end side to the roof reinforcement 22 via the roof side reinforcement 26.

The front doors 4F are openably/closably supported on the front pillars 31 via hinges (not shown), and, during closure, engaged with the center pillars 33 via strikers and latches (both unshown). The rear doors 4R are supported on the center pillars 33 via hinges (not shown) and, during closure, engaged with the rear pillars 37 via strikers and latches (both unshown).

Further in the automobile 1, as frame members constituting the frame of the floor of the automobile interior 2, there are also provided a pair of side sills 43 which extend longitudinally of the car body to support right-and-left side edge portions of a floor panel 41 forming the floor of the automobile interior 2 and, besides, a closed-in-cross-section cross member extending widthwise of the car body along the floor panel 41 in lower part of the automobile interior 2 and coupling the right-and-left side sills 43 to each other.

This cross member is preferably provided in some plural number in lower part of the automobile interior 2 (No. 2 cross member 45 and No. 3 cross member 47), where the rear-side No. 3 cross member 47 is coupled to rear end sides of the right-and-left side sills 43 and located below a rear seat 3R. Also, the front-side No. 2 cross members 45 are located below front seats 3F and couple the right-and-left side sills 43 to each other with a tunnel portion 42 interposed therebetween.

The side sills 43 are formed so as to have a closed cross-sectional space of a specified shape by joining edge portions of press molded outer panel and inner panel to each other. Also, the No. 2 cross members 45 and the No. 3 cross member 47 are joined at their side edge portions to the floor panel 41, thereby forming a closed cross-sectional space extending widthwise of the car body on the floor panel 41.

Figure 12:
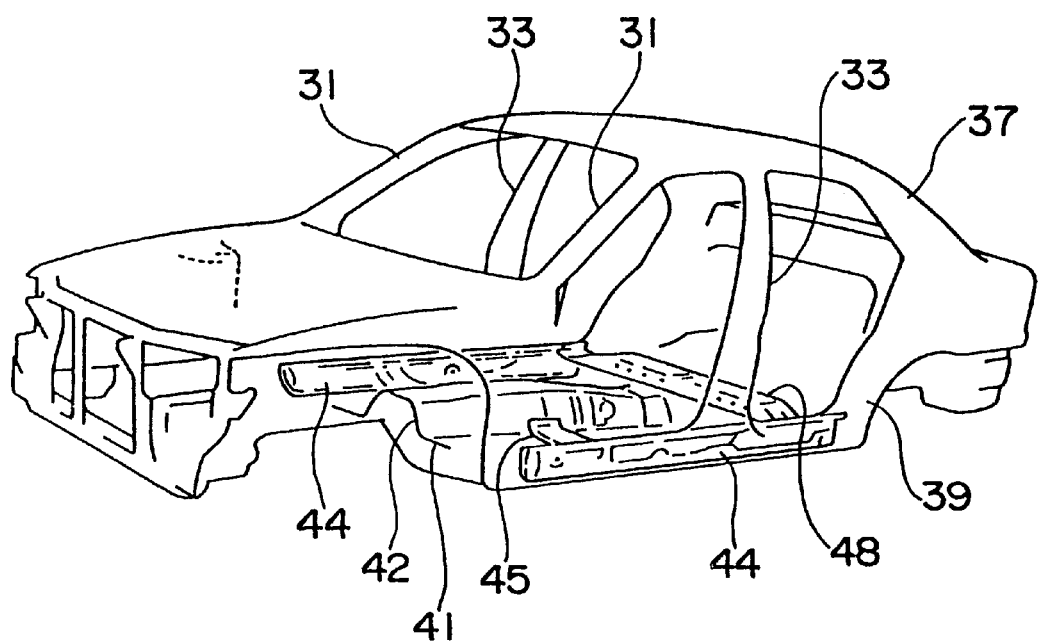
FIG. 12 is a perspective view showing the reinforcing member of the floor part of the automobile.

As shown in FIG. 12, the side sills 43 and the No. 3 cross member 47 are equipped with reinforcing members 44 and 48 extending longitudinally within the closed cross-sectional space and partitioning the closed cross-sectional space. The side sill reinforcements 44 are provided so as to extend over a generally entire longitudinal length of the automobile interior 2. Further, as will be detailed later, lower end portions of the center pillar reinforcements 34 are coupled to these side-sill reinforcements 44. Moreover, the side-sill reinforcing members 44 are set longer in front-side portion extending forward from the coupling part with the center pillars 33 than in rear-side portion extending rearward from the coupling part with the center pillars 33.

In a generally center widthwise of the floor panel 41, is provided a tunnel portion 42 of large cross section extending longitudinally of the car body. The tunnel portion 42 has a large hat-shaped cross section protruding upward, and a propeller shaft (not shown) is placed below the tunnel portion 42.

The floor panel 41 formed in this way is supported at its right-and-left side edge portions by the side sills 43 having a closed cross-sectional space of a large cross section. As a result of this, the floor part inherently has a very high stiffness.

Figure 8:
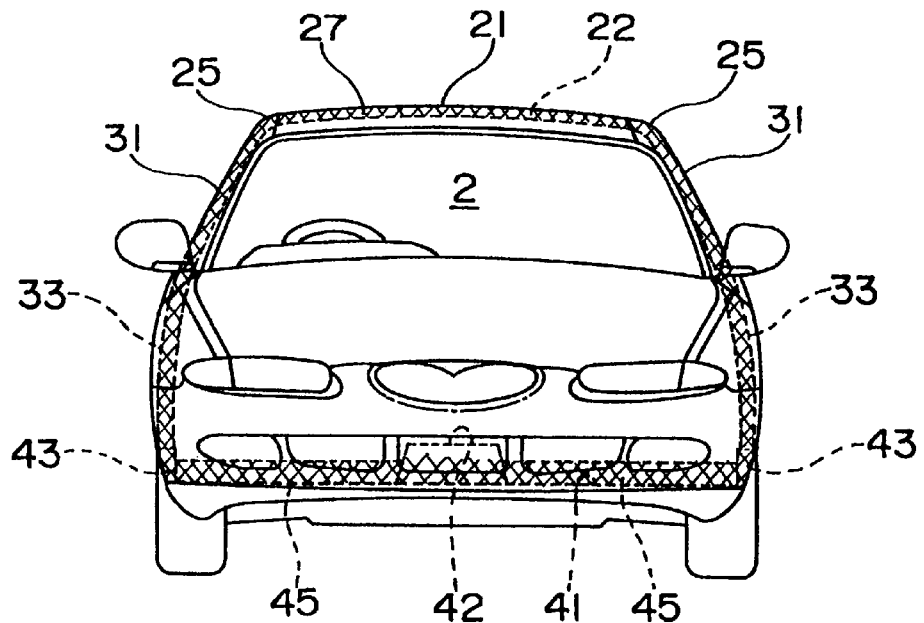
FIG. 8 is an explanatory front view showing the reinforcement structure of the automobile as the body is viewed from the front.
Figure 9:
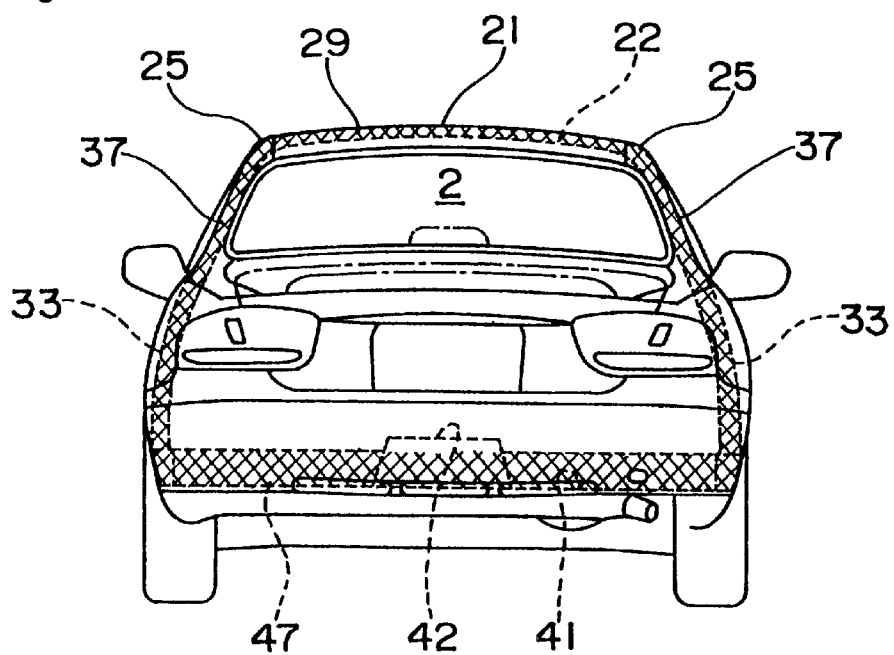
FIG. 9 is an explanatory rear view showing the reinforcement structure of the automobile as the body is viewed from the rear.

With the frame construction as shown above, in the automobile interior 2, as shown by cross hatching in FIG. 8, the floor panel 41 located in lower portion of the automobile interior is supported at its right-and-left side edge portions by the closed-in-cross-section side sills 43, thus inherently having a high stiffness. In addition to this, upper and right-and-left side portions of the automobile interior 2 are covered with a continuous closed cross section, as the automobile is viewed from the front. As a result of this, the stiffness around the automobile interior, as the automobile is viewed from the front, can be effectively enhanced without causing much increase in the car body weight.

As a result, deformation of the automobile interior 2 upon a collision of vehicles, especially upon a side collision, can be effectively suppressed so that the protective performance for the passengers in the automobile interior 2 can be improved.

Figure 6:
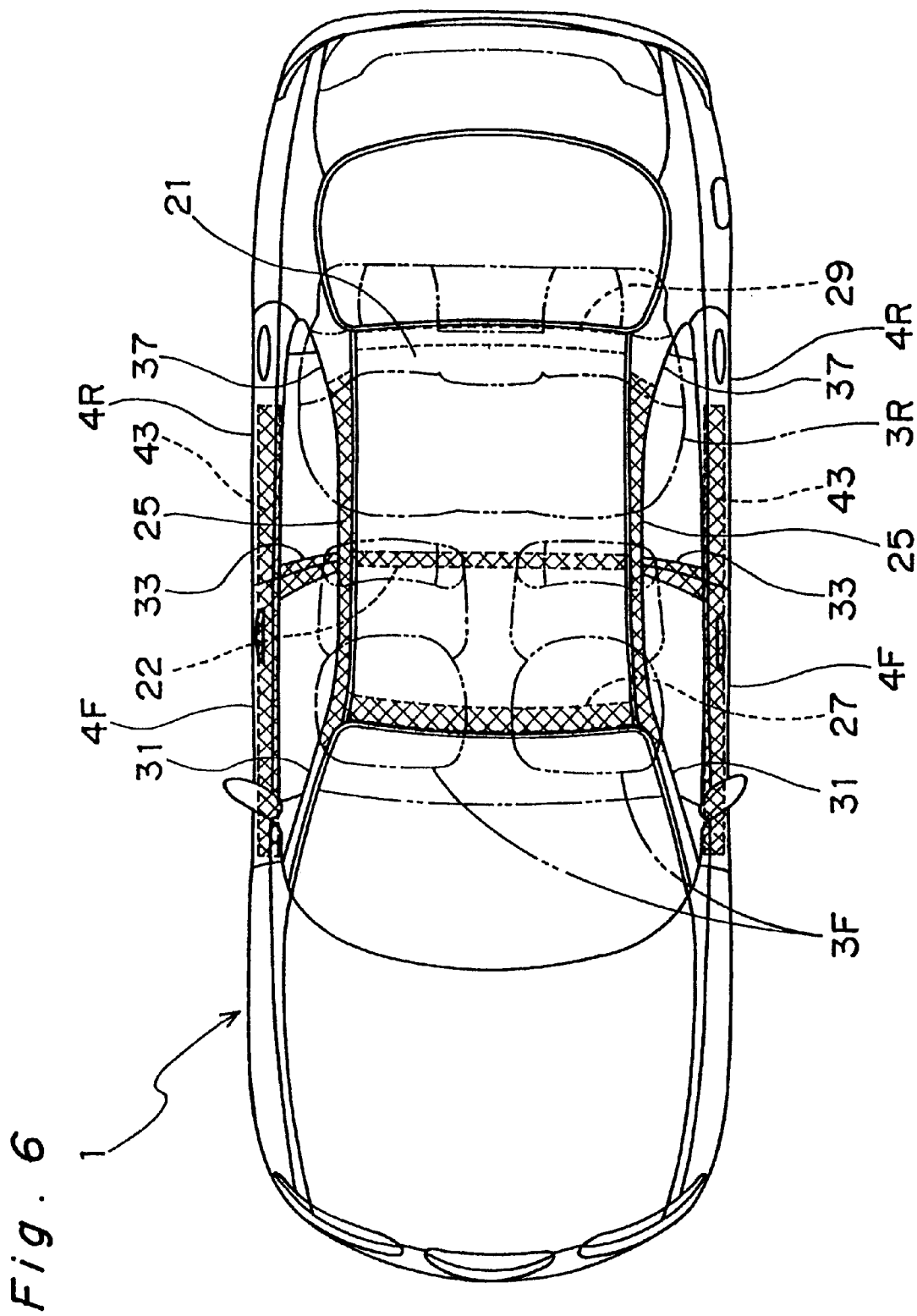
FIG. 6 is an explanatory plan view showing the reinforcement structure of the roof part of the automobile.
Figure 7:
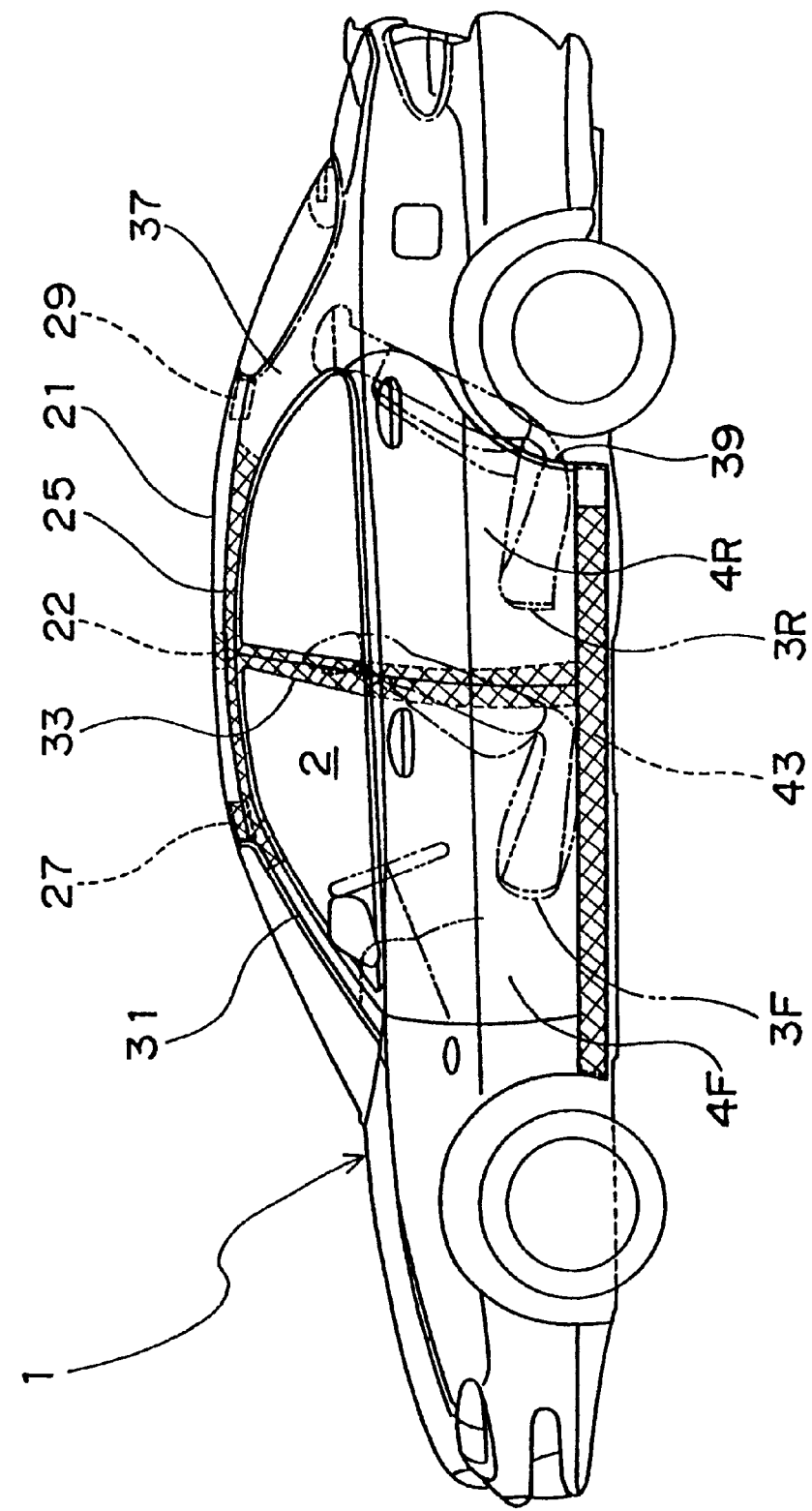
FIG. 7 is an explanatory side view showing the reinforcement structure of the body side part of the automobile.

Also, a pair of closed-in-cross-section roof side rails 25 extending longitudinally of the vehicle body are placed at right-and-left side edge portions of the roof panel 21 to support the side edge portions, and the right-and-left end portions of the roof reinforcement 22 are coupled to the reinforcing members 26 of the right-and-left roof side rails 25, respectively. Therefore, as indicated by cross hatching in FIG. 6, an H-shaped reinforcing structure, as seen in plan view, can be made up in the roof part of the vehicle body by the right-and-left pair of roof side rails 25 and the roof reinforcement 22. Further, since both upper-and-lower end sides of the reinforcing members 34 of the center pillars 33 are coupled to the reinforcing members of the roof side rails 25 and the reinforcing members 44 of the side sills 43, respectively, an H-shaped reinforcing structure, as seen in side view, can be made up also in the side portions of the vehicle body by the respective reinforcing members 26, 44, 34 of the roof side rails 25, the side sills 43 and the center pillars 33, as indicated by cross hatching in FIG. 7. As a result, the stiffness of the roof part and the side portions of the vehicle body can be further enhanced.

Still more, the reinforcing members 26 of the roof side rails 25 and the reinforcing members 44 of the side sills 43 are provided so as to extend over a generally entire longitudinal length of the automobile interior 2. Therefore, the above reinforcing structure can be provided in the roof part and side portions of the vehicle body over a generally entire longitudinal length of the automobile interior 2. As a result, the stiffness around the vehicle interior can be further enhanced.

In this case, the roof reinforcement 22 couples the upper end portions of the right-and-left center pillars 33 to each other. However, because the passengers' heads will normally not be located at these center pillar positions in the longitudinal direction of the vehicle body, the head clearance of the passengers will never be adversely affected. That is, the roof reinforcement 22 can be provided without impairing the roominess of the automobile interior 2.

Further, the front header 27 is formed into a particularly large cross section to function as a reinforcement for reinforcing the roof part. Since a plurality of roof reinforcements 22, 27 are provided like this, the stiffness of the roof part of the car body and the coupling strength between the right-and-left side portions of the car body are even more enhanced, so that the stiffness around the automobile interior can be further improved.

In this case, in particular, the roof reinforcement 22 couples upper end portions of the right-and-left center pillars 33 to each other, while the front header 27 couples upper end portions of the front pillars 31 to each other. Because passengers' heads will not be located at these pillar positions longitudinally of the car body, the roof reinforcements 22, 27 can be provided in some plural number without adversely affecting the head clearance of the passengers, i.e. without impairing the roominess of the automobile interior.

Further, the reinforcing members 26 of the roof side rails 25 and the reinforcing members 44 of the side sills 43 are set longer in front-side portion extending forward from the joint part with the center pillars 33 than in rear-side portion extending rearward from the joint part with the center pillars 33.

More specifically, the front doors 4F of the vehicle are supported by hinge on the front pillars 31 and, during the closure of the doors, engaged with the center pillars 33, while the rear doors 4R are supported by hinge on the center pillars 33. When a collision load is inputted sideways to the center pillars 33 or their proximities upon a side collision, the resulting door inrush amount (quantity of deformation) toward the automobile interior would normally become greater in the front doors 4F, which have a pivotal center of opening and closing of doors on the front pillar 31 side than in the rear doors 4R, which have a pivotal center of opening and closing of doors on the center pillar 33 side. However, by adopting the above constitution for the reinforcing members 26 of the roof side rails 25 and the reinforcing members 44 of the side sills 43, deformation of the front doors 4F toward the automobile interior can be suppressed, compared with the rear doors 4R, so that the inrush amount of the front-and-rear doors toward the automobile interior can be balanced, thus allowing an efficient reinforcement to be attained.

Figure 10:
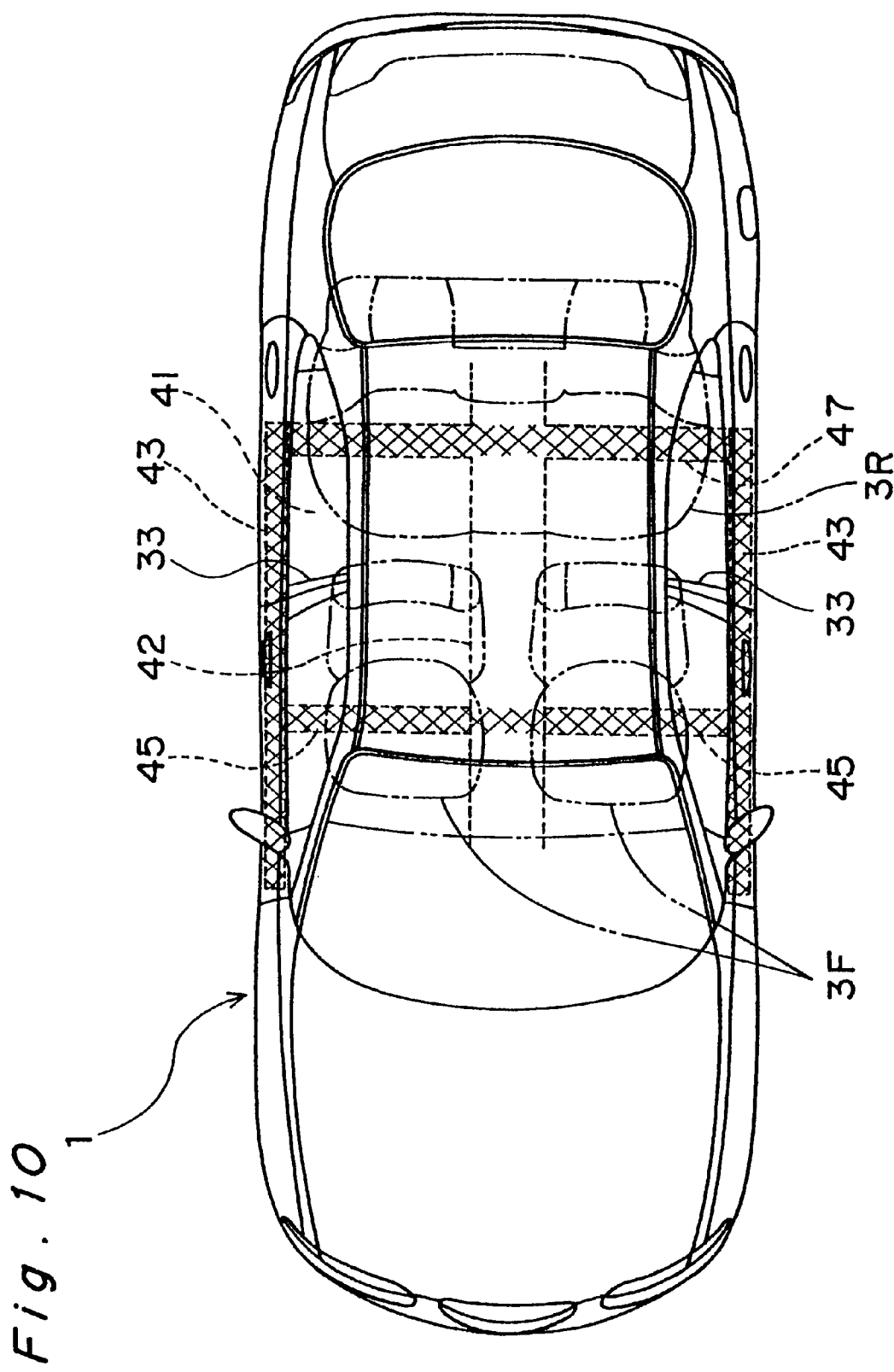
FIG. 10 is an explanatory plan view showing the reinforcement structure of the floor part of the automobile.

Further, since the closed-in-cross-section cross members 45, 47 extending widthwise of the car body in lower part of the automobile interior 2 and coupling the right-and-left side sills 43 to each other are provided, it becomes possible to make up an H-shaped (or U-shaped) reinforcing structure, as seen in plan view, also for the floor part of the car body, as indicated by cross hatching in FIG. 10, by a right-and-left pair of side sills 43 and the cross members 45, 47. Thus, the floor part of the car body can be further enhanced in stiffness and, as a result, the stiffness around the automobile interior can be further improved.

Further, in particular, the No. 3 cross member 47 couples the rear end portions of the right-and-left side sills 43 to each other. Since the rear end portions of the side sills 43 are normally located below the rear seat 3R, the cross member 47 will never adversely affect the assurance of the underfoot space for the passengers who are seated on the rear seat 3R.

Accordingly, the cross member 47 that reinforces the floor part can be provided without impairing the roominess of the automobile interior 2.

Further, since a plurality of cross members 45, 47 are provided, the stiffness of the floor part of the car body and the coupling strength between the right-and-left side portions of the car body can be even more enhanced so that the stiffness around the automobile interior can be further improved.

In this case, because the cross members 45, 47 are provided below the front seat 3F or the rear seat 3R, the cross members 45, 47 will never adversely affect the assurance of the underfoot space for the passengers who are seated on the front seat 3F or the rear seat 3R. Accordingly, a plurality of cross members 45, 47 for reinforcing the floor part can be provided without impairing the roominess of the automobile interior 2.

Next, the frames serving as the basic structure around the automobile interior of the automobile 1 as well as their coupling portions are described in detail.

In this embodiment, as described above, the roof of the car body is equipped with a closed-in-cross-section roof reinforcement 22 extending widthwise of the car body along the roof panel 21, and right-and-left end portions of the roof reinforcement 22 are coupled to upper end portions of a right-and-left pair of closed-in-cross-section center pillars 33 which are located between front-and-rear door openings provided in side portions of the car body and which extend in upper-and-lower direction of the vehicle body, respectively. Also, lower end portions of the center pillars 33 are coupled to the side sills 43 of the floor part, respectively.

Figure 15:
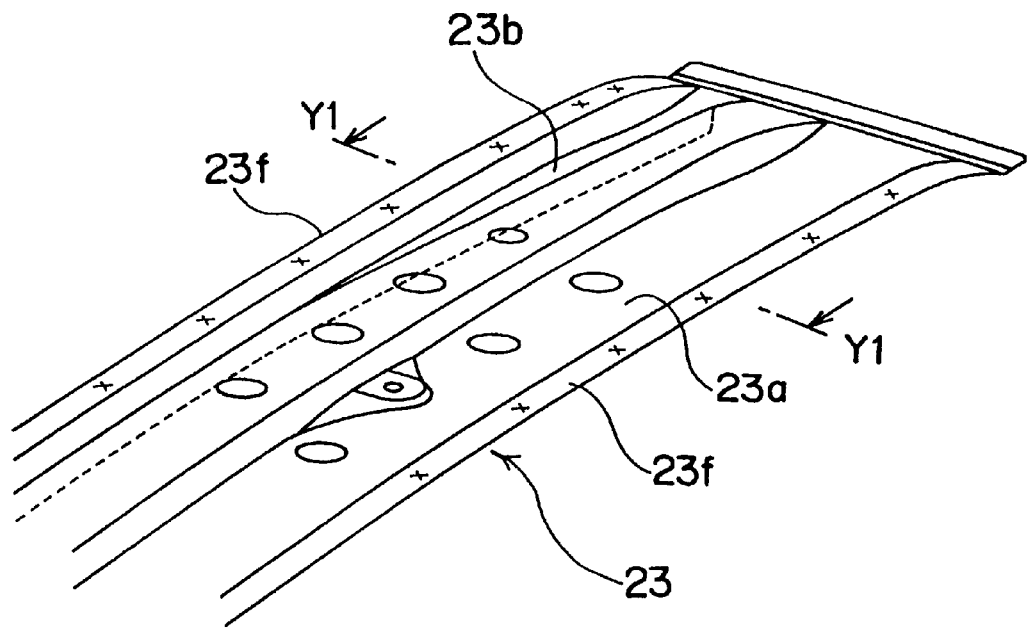
FIG. 15 is a partial perspective view of the roof reinforcement of the automobile.
Figure 16:
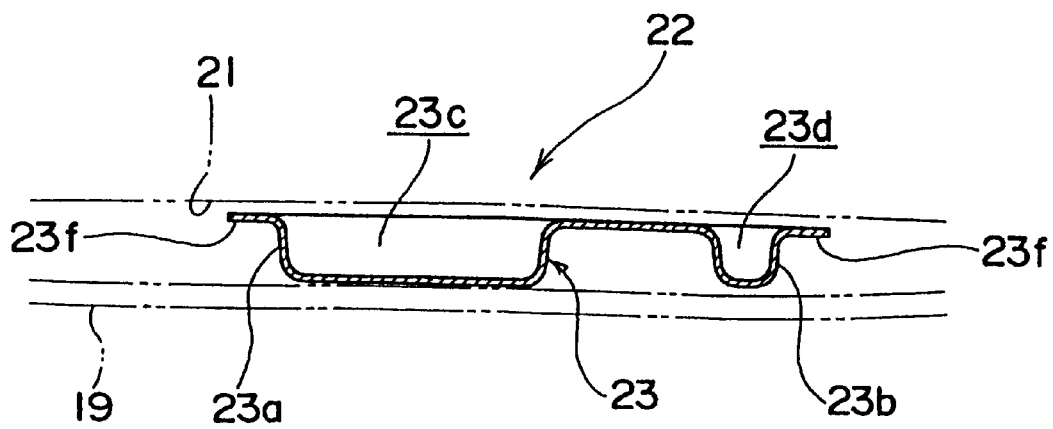
FIG. 16 is an explanatory view in longitudinal cross section taken along the line Y1—Y1 in FIG. 15, showing the fitting structure of the roof reinforcement.

In the roof reinforced part 22, as shown in FIGS. 15 and 16, a reinforcing member 23 (roof reinforcement) made of steel plate having protrusions 23a, 23b protruding downward is joined to the inner side of the roof panel 21 at side edge flanges 23f extending longitudinally of the reinforcing member 23 (widthwise of the car body), by which closed cross-sectional spaces 23c, 23d extending widthwise of the car body are formed. In addition, lower portion (automobile interior side) of the roof reinforcement 23 is covered with ceiling material 19.

Figure 17:
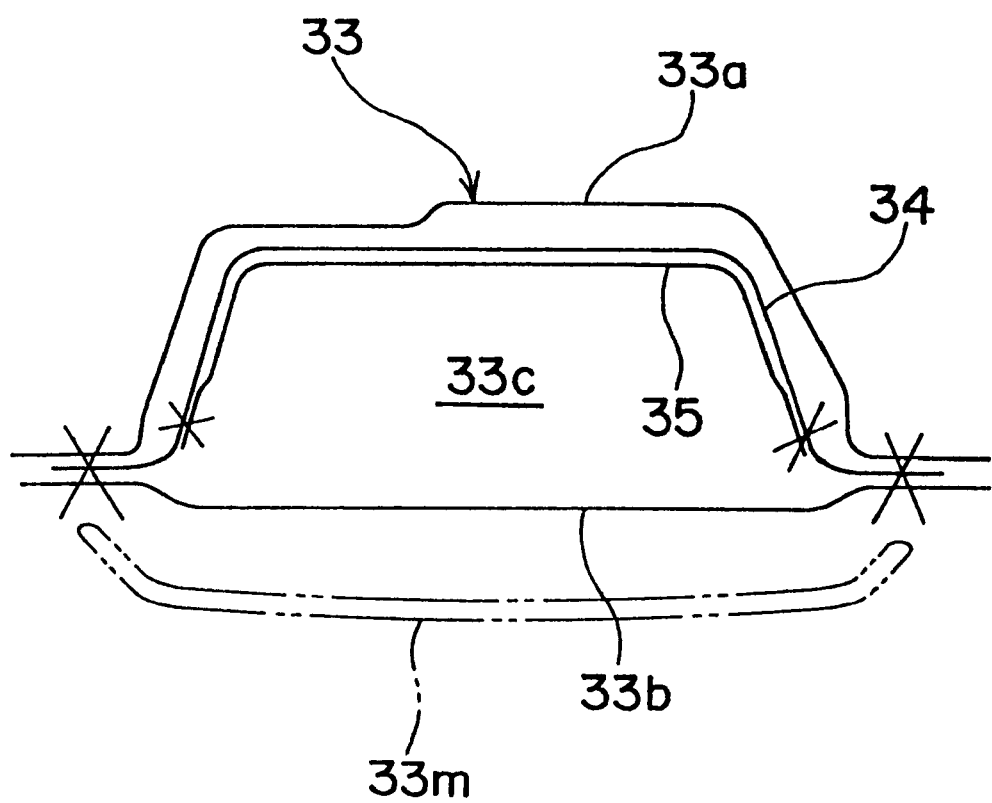
FIG. 17 is a cross-sectional explanatory view showing the basic cross-sectional structure of the center pillar of the automobile.

In the center pillars 33, as its basic cross-sectional structure is shown in FIG. 17, a pillar outer panel 33a and a pillar inner panel 33b form a closed cross-sectional space 33c extending in upper-and-lower direction, and a reinforcing member (center pillar reinforcement 34) extending longitudinally within the closed cross-sectional space 33c and partitioning the closed cross-sectional space is provided. These three sheets of steel plate members, the pillar outer panel 33a, the pillar inner panel 33b and the center pillar reinforcement 34, are joined together by, for example, spot welding with their widthwise end portions stacked in three sheets. In addition, the pillar inner panel 33b is covered on its automobile interior side by an interior trim member 33m.

Figure 18:
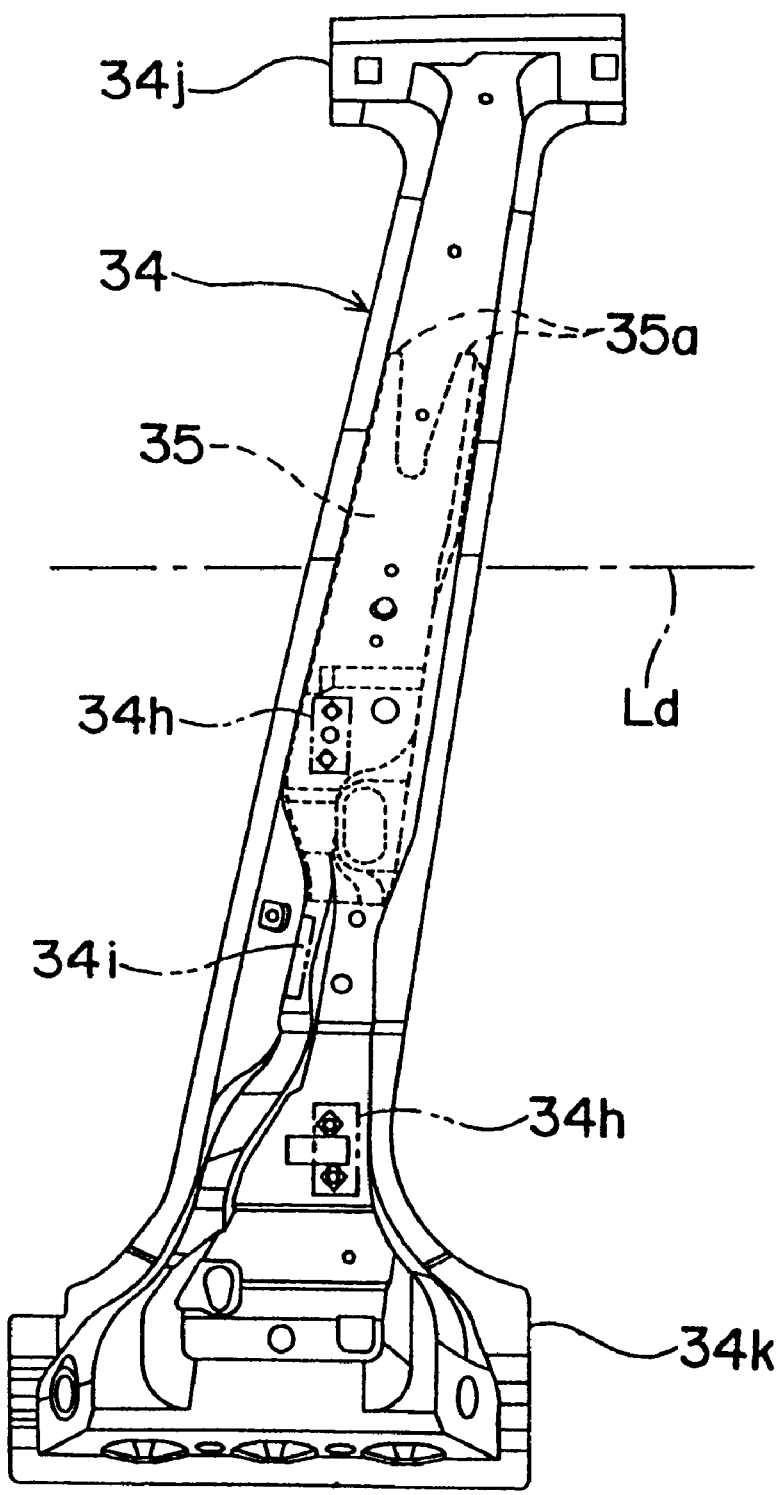
FIG. 18 is an explanatory front view of the pillar reinforcement of the center pillar.
Figure 19:
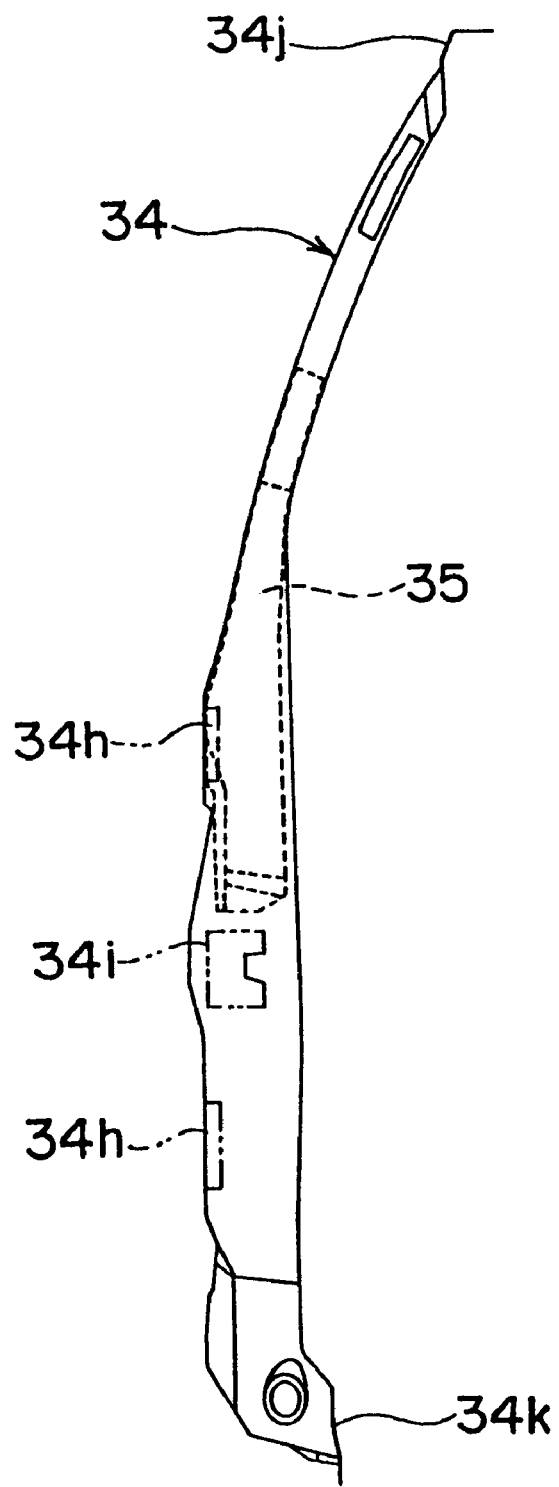
FIG. 19 is an explanatory side view of the pillar reinforcement.
Figure 21:
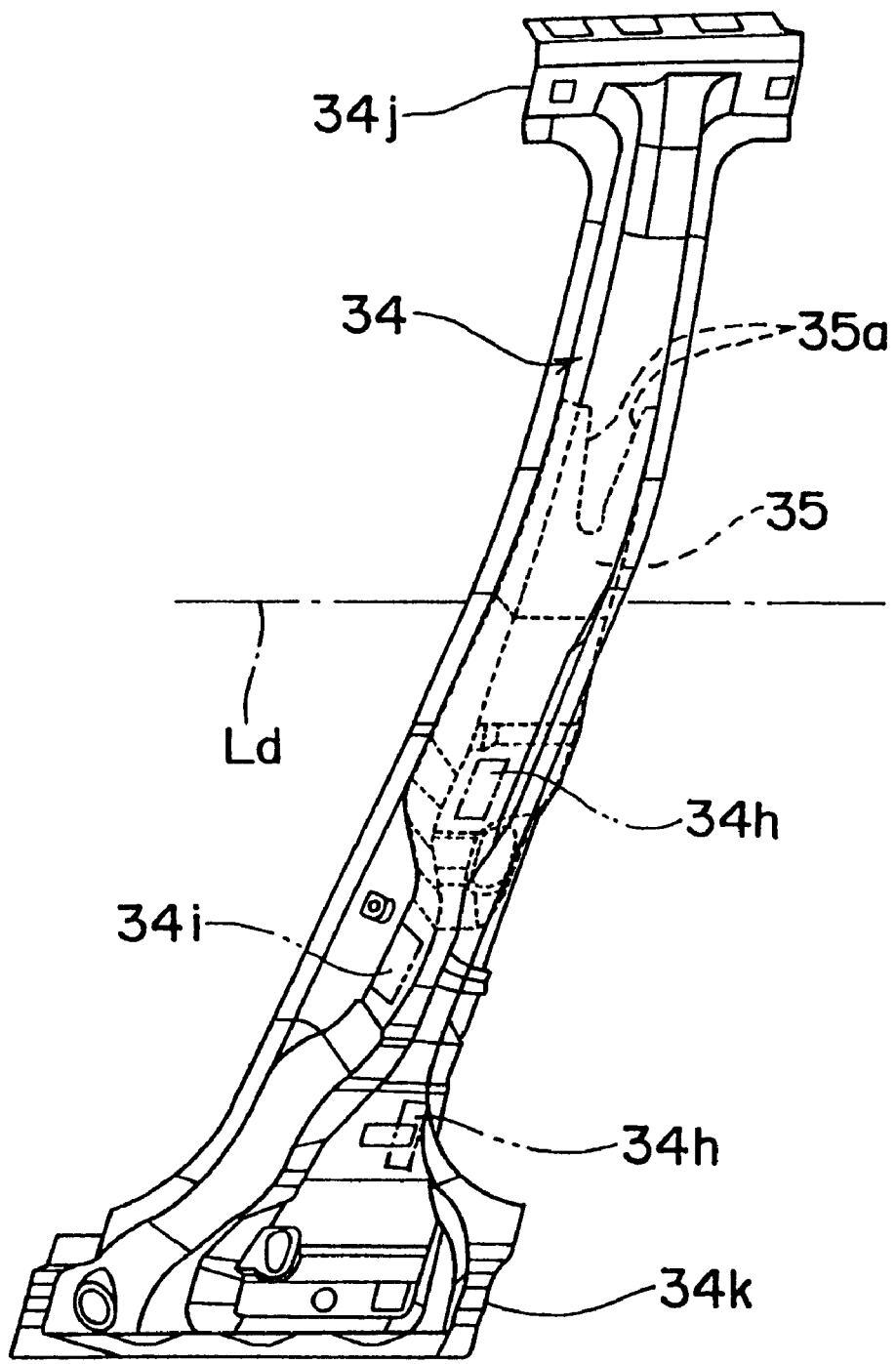
FIG. 21 is a perspective view of the pillar reinforcement.

In the center pillar reinforcement 34, as shown in FIGS. 18, 19 and 21, an upper base portion 34j for joint with the roof reinforced part 22 and the roof side rails 25 is provided on the upper end side, and a lower base portion 34k for joint with the side sills 43 is provided on the lower side.

Also, at vertically intermediate portions of the center pillar reinforcement 34, are provided a latch fitting portion 34i for fitting latches (not shown) to be engaged with strikers (not shown) of the front doors 4F, and an upper-and-lower pair of hinge fitting portions 34h for fitting hinges (not shown) of the rear doors 4R.

Furthermore, inside the center pillar reinforcement 34 and in a region including a site corresponding to a boundary line Ld (see FIGS. 18 and 21) between the doors 4F and 4R themselves and the door glass openings, a center hinge reinforcement 35 is provided as reinforcing means for relaxing concentration of stress at the site corresponding to the boundary when a collision load is inputted to the center pillar reinforcement 34 via the doors 4F or 4R upon a collision of vehicles.

More specifically, upon occurrence of a collision of vehicles, when a collision load is inputted to center pillar reinforcement 34 via the doors 4F or 4R, there would occur a concentration of stress at a site corresponding to the boundary line Ld between the doors themselves and the door glass opening portions on the ground that the thick doors themselves formed of steel plate and the door glass opening portions above them are different in load transferability. However, this concentration of stress is effectively relaxed by the provision of the center hinge reinforcement 35.

Figure 20:
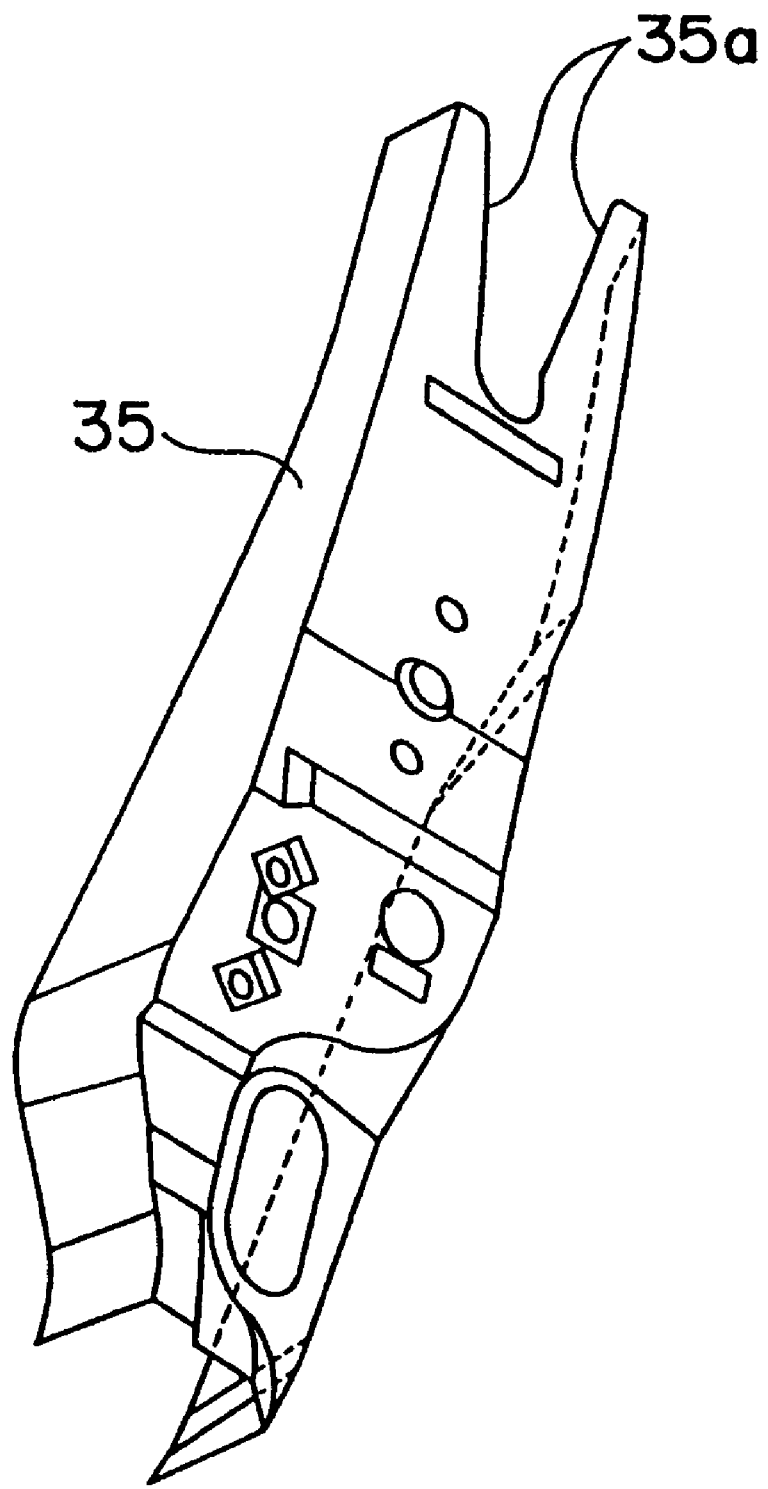
FIG. 20 is a perspective view of the center reinforcement of the center pillar.

The center hinge reinforcement 35, as can be well understood from FIG. 20, has its cross section formed into a generally U-shape and longitudinal one side branched into two, and the center hinge reinforcement 35 is so placed that the resulting branch portions 35a are positioned upward. This allows the upward (to the roof-side) transfer of a collision load to be slowed down as compared with the downward transfer. That is, the load transfer toward the roof that is lower in stiffness than the floor can be relaxed so that the deformation of the automobile interior 2 due to a side collision can be suppressed.

As shown above, by equipping the center pillars 33 with the center hinge reinforcement 35 as reinforcing means, it becomes possible to effectively relax the concentration of stress that occurs at a site corresponding to the boundary line Ld between the thick doors themselves formed of steel plate and the door glass openings when a collision load is inputted to the center pillars 33 via the door. Also, the center hinge reinforcement 35 is more preferablly constituted so that the stiffness of a portion thereof corresponding to the door glass opening is reduced gradually in upper direction. Therefore, it becomes possible to further effectively relax the above mentioned concentration of stress.

Figure 22:
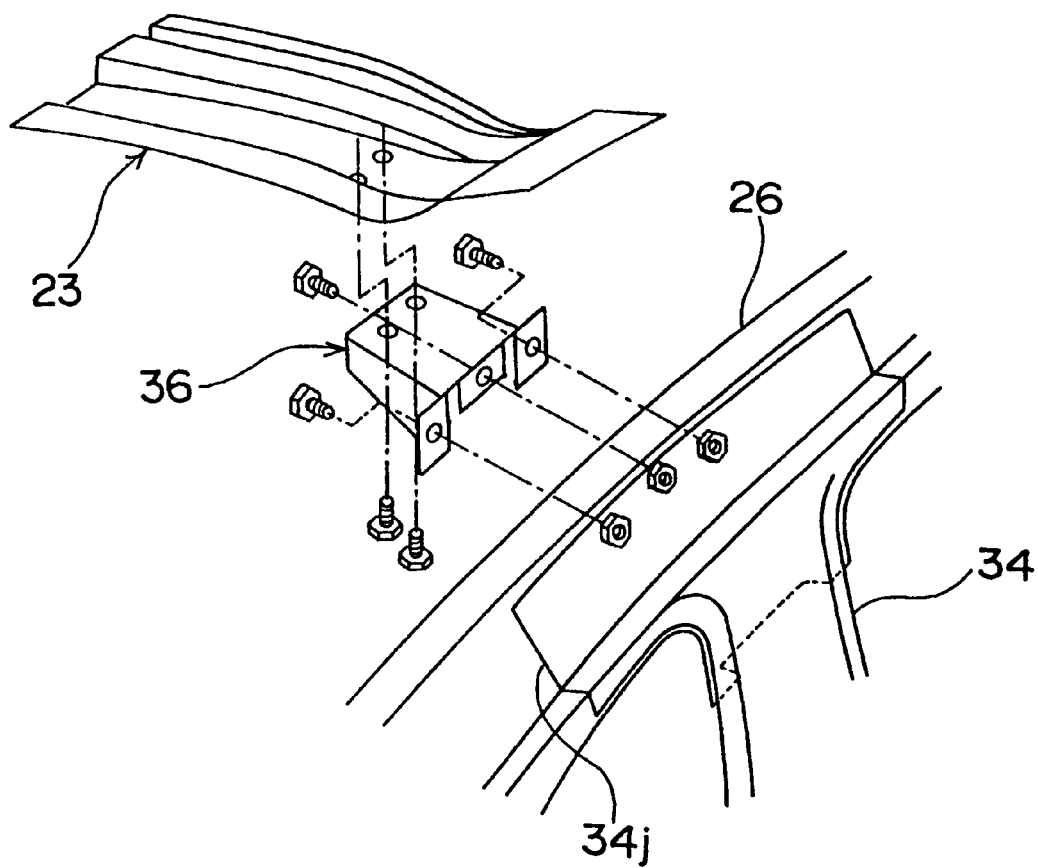
FIG. 22 is an exploded perspective view of the coupling portion between the roof reinforcement and the upper end side of the center pillar.
Figure 23:
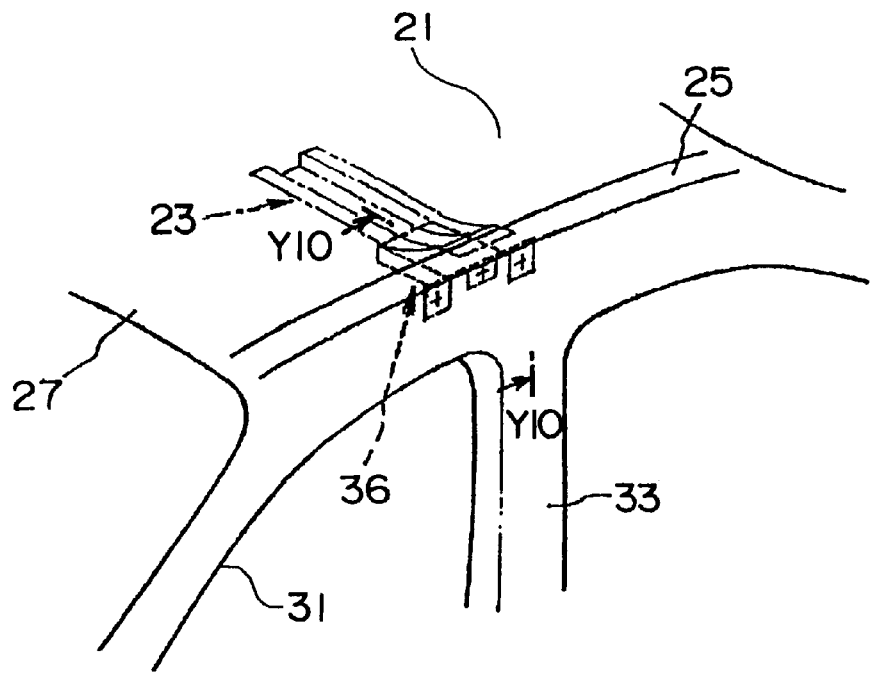
FIG. 23 is a perspective view showing the coupling portion between the roof reinforcement and the upper end side of the center pillar.
Figure 24:
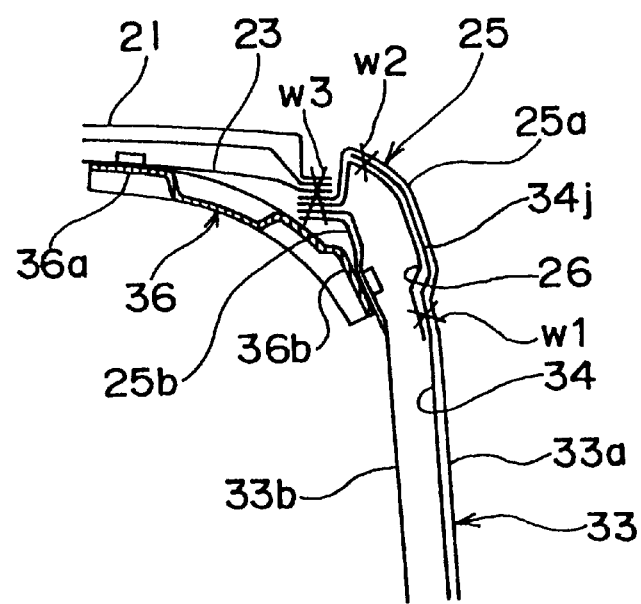
FIG. 24 is an explanatory view in longitudinal cross section taken along the line Y10—Y10 of FIG. 23.

In this embodiment also, as shown in detail in FIGS. 22, 23 and 24, a corner gusset 36 is used to couple the right-and-left end portions of the roof reinforced part 22 (i.e., right-and-left end portions of its reinforcing member, the roof reinforcement 23) and the upper end portions of the center pillars 33, the corner gusset 36 stretching their coupling portion from inside to couple them.

Figure 25:
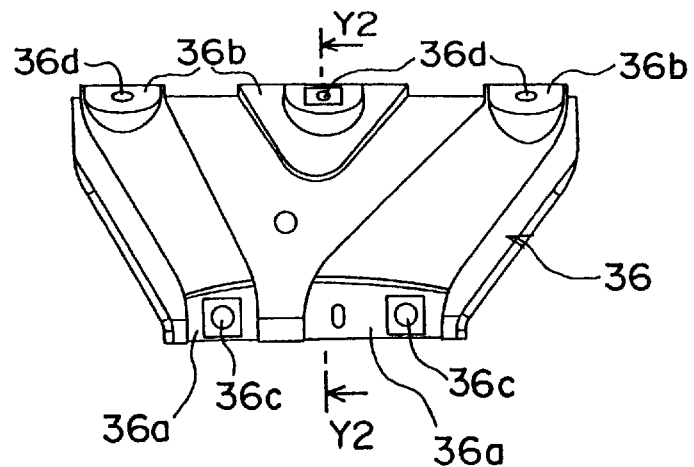
FIG. 25 is a perspective view of a corner gusset used in the coupling portion between the roof reinforcement and the upper end side of the center pillar.
Figure 26:
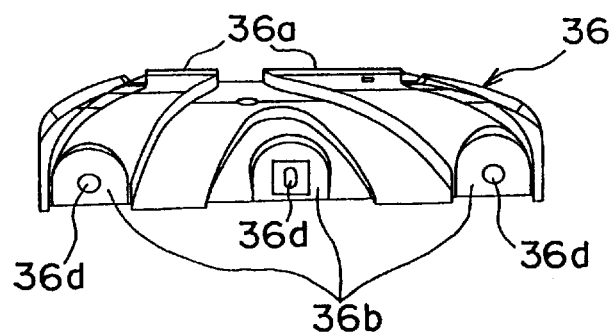
FIG. 26 is an explanatory front view of the corner gusset.
Figure 27:
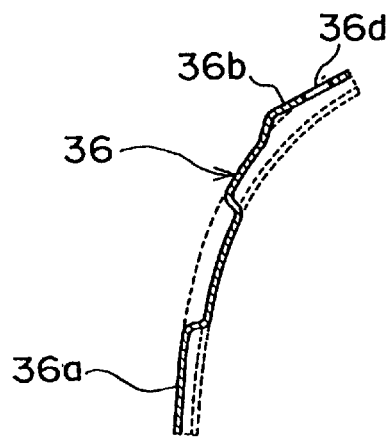
FIG. 27 is an explanatory view in longitudinal cross section taken along the line Y2—Y2 of FIG. 25.

The corner gusset 36, as shown in FIGS. 25 to 27, is formed into a generally U-shaped cross section opened downward with a fitting surface 36a for the roof reinforcement 23 and a fitting surface 36b for upper end portions of the center pillars 33 adjoined in a curved state. A plurality of bolt holes 36c, 36d are provided in the fitting surfaces 36a, 36b.

When the right-and-left end portions of the roof reinforced part 22 (i.e., of the roof reinforcement 23) and the upper end portions of the center pillars 33 are coupled to each other via the roof side rails 25, as shown in FIG. 24, the upper base portion 34j of the center pillar reinforcement 34, which is the reinforcing member of the center pillars 33, is located inside an outer panel 25a of the roof side rails 25 (roof side rail outer), and then the roof-side reinforcement 26, which is the reinforcing member of the roof side rails 25, is located further inside, in which state the roof-side reinforcement 26, the upper base portion 34j of the center pillar reinforcement 34 and the roof side rail outer panel 25a are stacked in three and joined together by, for example, spot welding at welding portions w1, w2.

Also, the side-edge flange portion of the roof-side reinforcement 26 is overlapped below the side edge flange portion of the roof panel 21 and the side-edge flange portion of the roof reinforcement 23. Moreover, the side-edge flange portion of the pillar inner panel 33b and the side-edge flange portion of a roof side rail inner 25b are stacked further below one by one. The resulting seven sheets of side-edge flange portions are joined together by, for example, spot welding at a welding portion w3.

In the way as shown above, the roof reinforcement 23 that is the reinforcing member of the roof of the car body, the roof-side reinforcement 26 that is the reinforcing member of the roof side rails 25 and the upper base portion 34j of the center pillar reinforcement 34 that is the reinforcing member of the center pillars 33 are directly joined together.

After the welding process is completed, the corner gusset 36 is fitted so as to stretch the coupling portion between the side end portion of the roof reinforcement 23 and the center pillar 33 from the inside of the automobile interior. That is, one fitting surface 36a is put into contact with the lower surface of the roof reinforcement 23 while the other fitting surface 36b is put into contact with the automobile interior side of the roof side rail inner 25b that is overlapping with the center pillar inner panel 33b, in which state, as shown in FIG. 22, the corner gusset 36 is fixedly tightened at both fitting surfaces 36a, 36b by using bolts.

By fitting the corner gusset 36 from the inside of the automobile interior in this way, the right-and-left side end portions of the roof reinforced part 22 (roof reinforcement 23) and the upper end portions of the center pillars 33 are coupled to each other so that their closed cross sections adjoin with reliability. Also, the coupling portion can be reinforced so that its stiffness can be enhanced.

Figure 28:
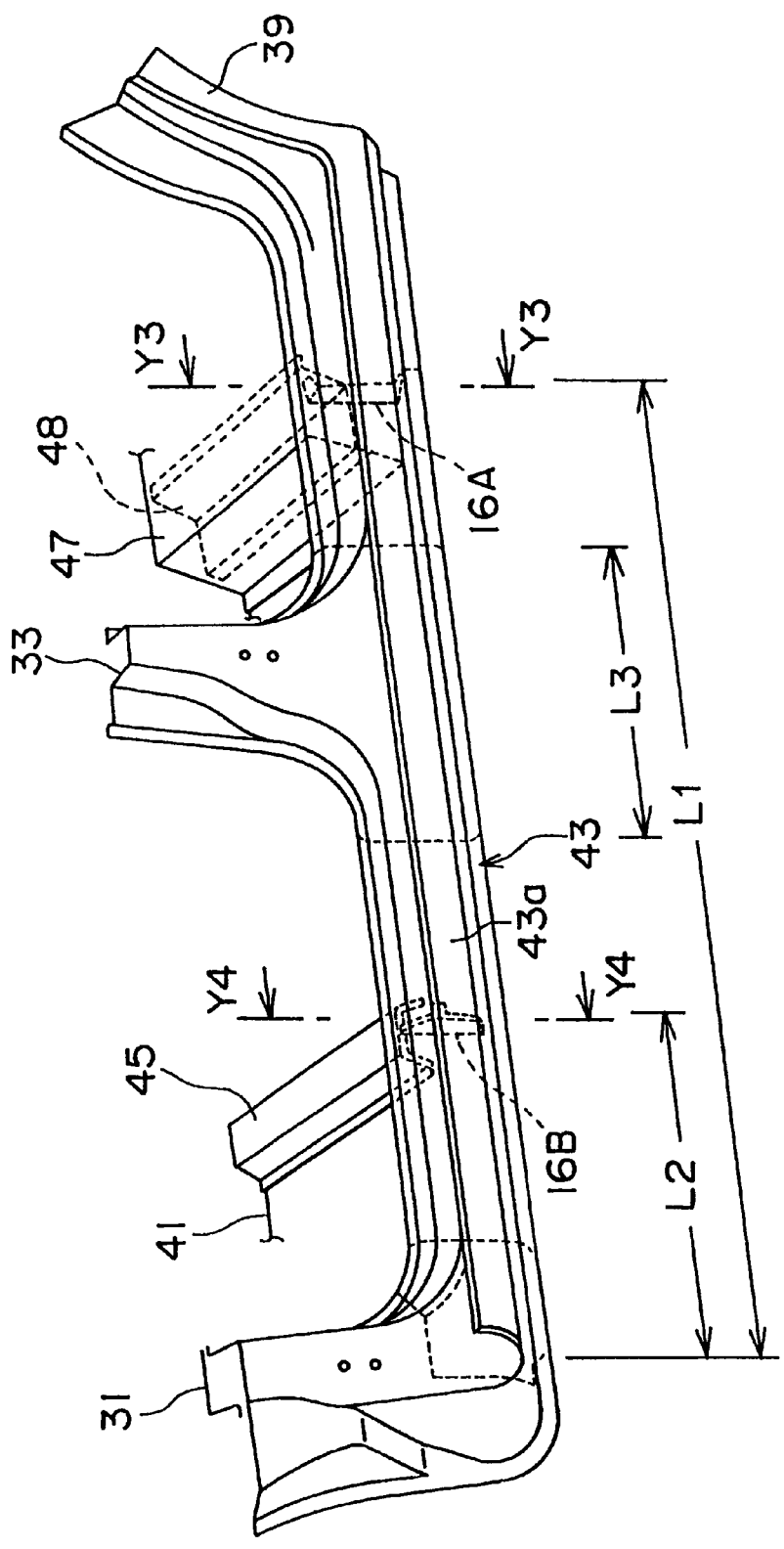
FIG. 28 is a perspective view of the frame structure of body lower part including the side sill of the automobile, as viewed from the outside of the body.
Figure 31:
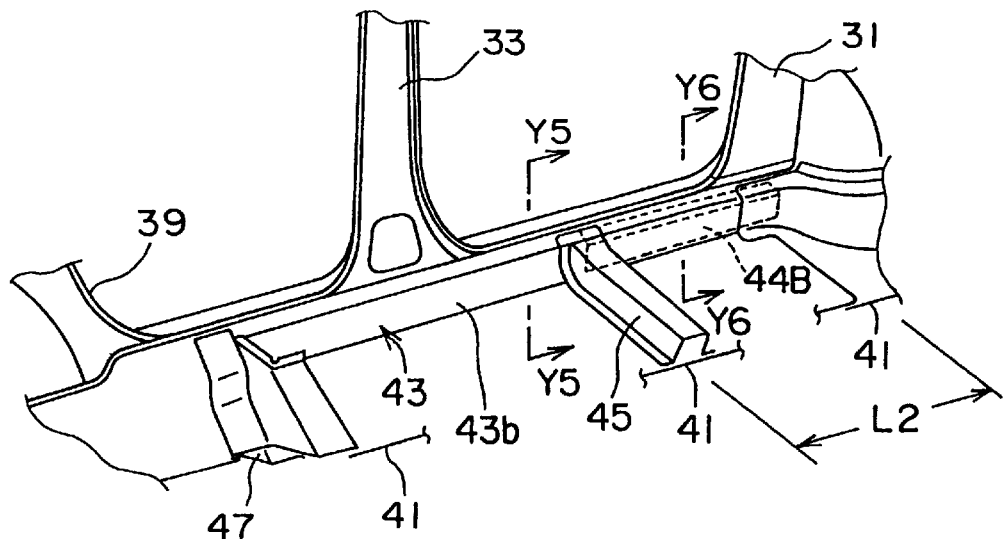
FIG. 31 is a perspective view of the frame structure of body lower part including the side sill of the automobile, as viewed from the inside of the body.
Figure 32:
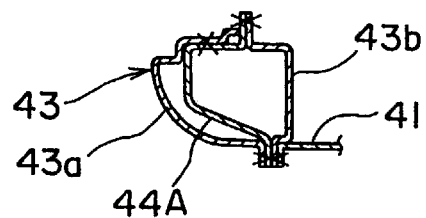
FIG. 32 is an explanatory view in longitudinal cross section taken along the line Y5—Y5 of FIG. 31.
Figure 33:
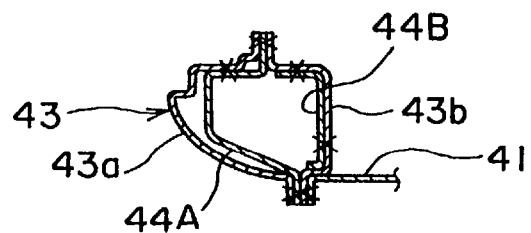
FIG. 33 is an explanatory view in longitudinal cross section taken along the line Y6—Y6 of FIG. 31.

FIGS. 28 and 31 are perspective views of the frame structure of lower part of the car body including the side sills 43, as viewed from outside and inside, respectively, of the car body.

As shown in these figures, to upper part of the side sills 43 that support the right-and-left side edge portions of the floor panel 41, are coupled lower part of the front pillars 31, lower part of the center pillars 33 and lower part of a rear tire arch 39 adjoining lower part of the rear pillar 37. Also, inside the side sills 43, the No. 2 cross member 45 is coupled between the front pillars 31 and the center pillars 33 while the No. 3 cross member 47 is coupled between the center pillars 33 and the rear tire arch 39.

Figure 30:
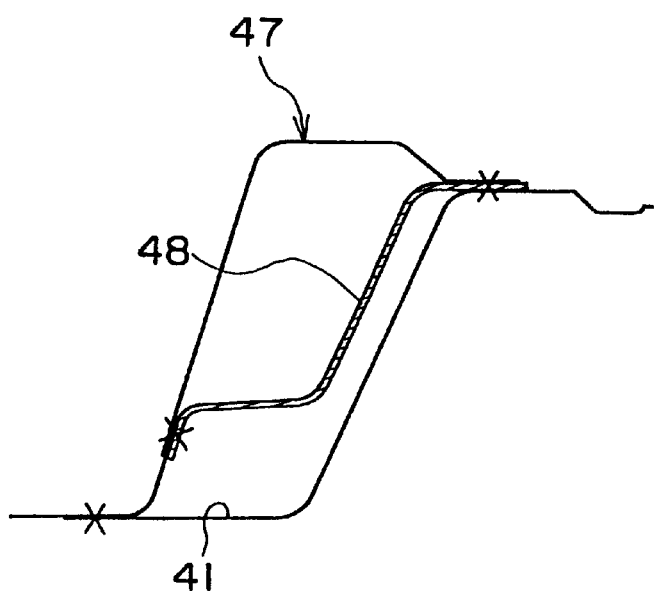
FIG. 30 is an explanatory view in longitudinal cross section of No. 3 cross member of the automobile.

In addition, the No. 2 cross members 45 and the No. 3 cross member 47, as described before, are located below the front seat 3F and the rear seat 3R, respectively. Further, in the closed cross-sectional space of the No. 3 cross member 47, a reinforcing member 48 (reinforcement) of a generally L-shaped cross section is provided widthwise of the car body as shown in FIG. 30.

Figure 34:
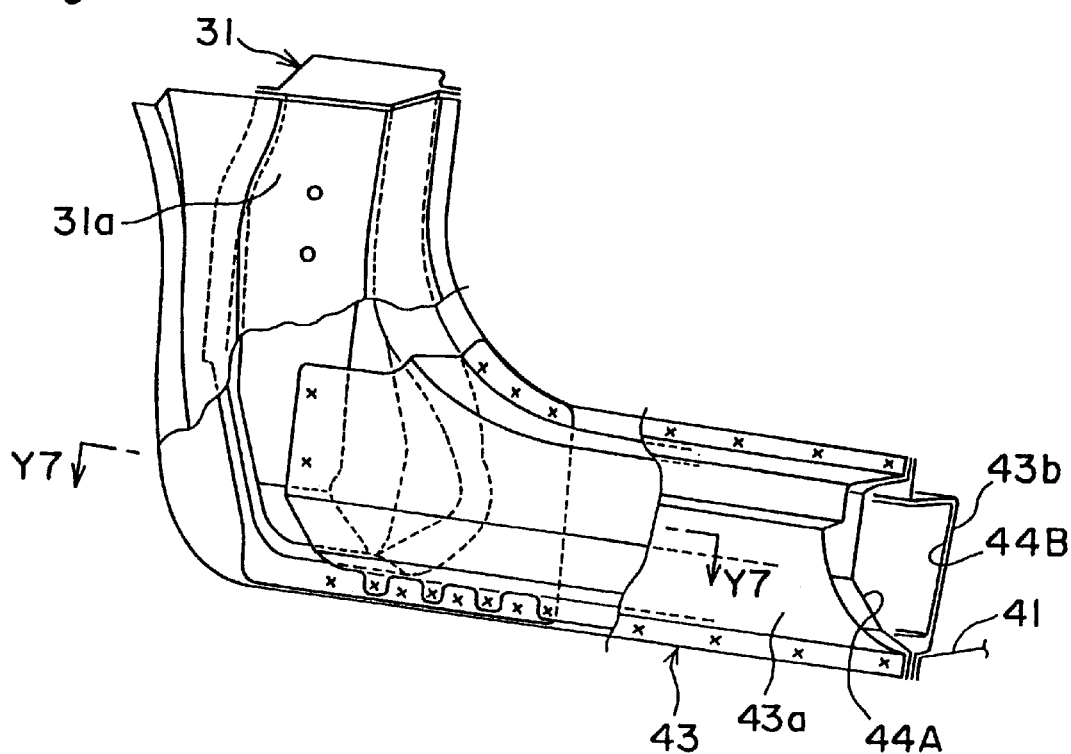
FIG. 34 is a perspective view showing the details of the coupling portion between the side sill and the front pillar.
Figure 35:
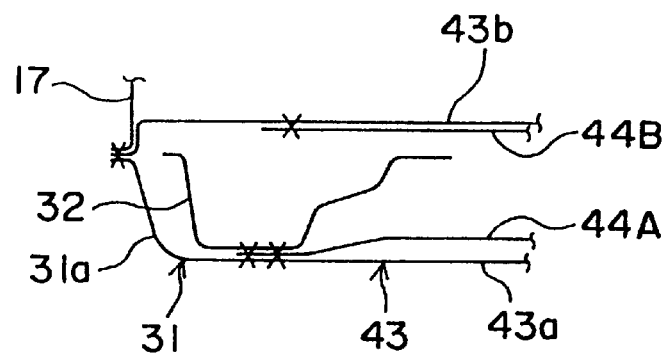
FIG. 35 is an explanatory view in longitudinal cross section taken along the line Y7—Y7 of FIG. 34.

FIG. 34 shows details of the coupling portion between the side sills 43 and the front pillars 31. FIG. 35 is an explanatory view in cross section taken along the line Y7—Y7 of FIG. 34. As shown in these figures, inside a side sill outer 43a forming an outer panel of the side sill 43, is placed a first reinforcing member (side-sill-outer reinforcement 44A) with a length of L1 extending longitudinally of the car body (see FIG. 28). Upper end portion and lower end portion of the side-sill-outer reinforcement 44A are joined to upper end portion and lower end portion of the side sill outer 43a, respectively, by, for example, spot welding, as indicated by X mark after they are sandwiched between upper end portion and lower end portion of a side sill inner 43b forming an inner panel of the side sills 43.

It is noted that side end portions of the floor panel 41 are also stacked and joined inside the lower end of the side sill inner 43b. Further, reference numeral 17 in FIG. 35 denotes a dash lower/torque-box lower, whose side end portions are joined to front end portions of the side sill outer 43a and the side sill inner 43b.

Furthermore, outside the side sill inner 43b widthwise of the car body, is provided a second reinforcing member (side-sill-inner reinforcement 44B) with a length of L2 (L2<L1; see FIGS. 28 and 31) extending longitudinally of the car body. The side-sill-inner reinforcement 44B is joined to the side sill inner 43b by, for example, spot welding as indicated by X mark.

A front end portion of the side-sill-outer reinforcement 44A is joined by, for example, spot welding as indicated by X mark after they are sandwiched between the lower end portion of a front pillar outer 31a, which forms an outer panel of the front pillar 31, and the lower end portion of the reinforcing member (front-pillar reinforcement 32) of the front pillars 31.

The side-sill-outer reinforcement 44A, as shown in FIG. 28, extends by a length of L1 rearward of the car body, its rear end portion being stacked on and joined to the side end portion of the No. 3 cross member 47.

The side-sill-inner reinforcement 44B is joined to the lower end portion of a front pillar inner 31b forming an inner panel of the front pillars 31 by, for example, spot welding as indicated by X mark.

This side-sill-inner reinforcement 44B, as shown in FIGS. 28 and 31, extends by a length of L2 rearward of the car body, its rear end portion being stacked on and joined to the side end portion of the No. 2 cross member 45. In addition, this side-sill-inner reinforcement 44B may also be extended by a length of L1 like the side-sill-outer reinforcement 44A, its rear end portion being stacked on and joined to the side end portion of the No. 3 cross member 47.

Figure 29:
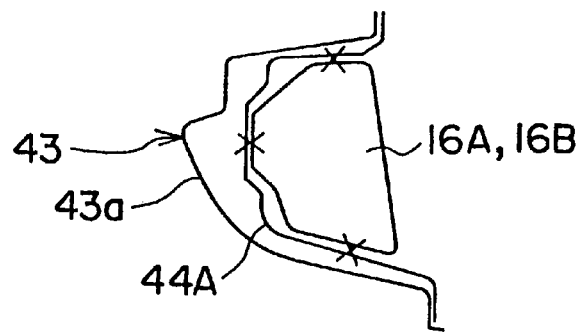
FIG. 29 is an explanatory view in longitudinal cross section taken along the line Y3—Y3 or Y4—Y4 of FIG. 28.

Also, as shown in FIG. 28, in a part where the rear end portion of the side-sill-outer reinforcement 44A and the side end portion of the No. 3 cross member 47 are stacked on each other, a rear segment member 16A that protrudes inward from the rear end portion of the side-sill-outer reinforcement 44A widthwise of the car body is provided in the closed cross-sectional space of the side sills 43. This rear segment member 16A, as indicated by X mark in FIG. 29, is joined to the inner surface of the side-sill-outer reinforcement 44A by, for example, spot welding.

It is noted that the rear segment member 16A may also be integrally formed by inwardly bending the rear end portion of the side-sill-outer reinforcement 44A.

Furthermore, as shown in FIG. 28, in a part where the rear end portion of the side-sill-inner reinforcement 44B and the side end portion of the No. 2 cross member 45 are stacked on each other, a front segment member 16B that protrudes outwardly from the rear end portion of the side-sill-inner reinforcement 44B widthwise of the car body is provided in the closed cross-sectional space of the side sills 43. This front segment member 16B, as indicated by X mark in FIG. 29, is joined to the inner surface of the side-sill-outer reinforcement 44A by, for example, spot welding.

It is noted that the front segment member 16B may also be integrally formed by outwardly bending the rear end portion of the side-sill-inner reinforcement 44B.

Figure 36:
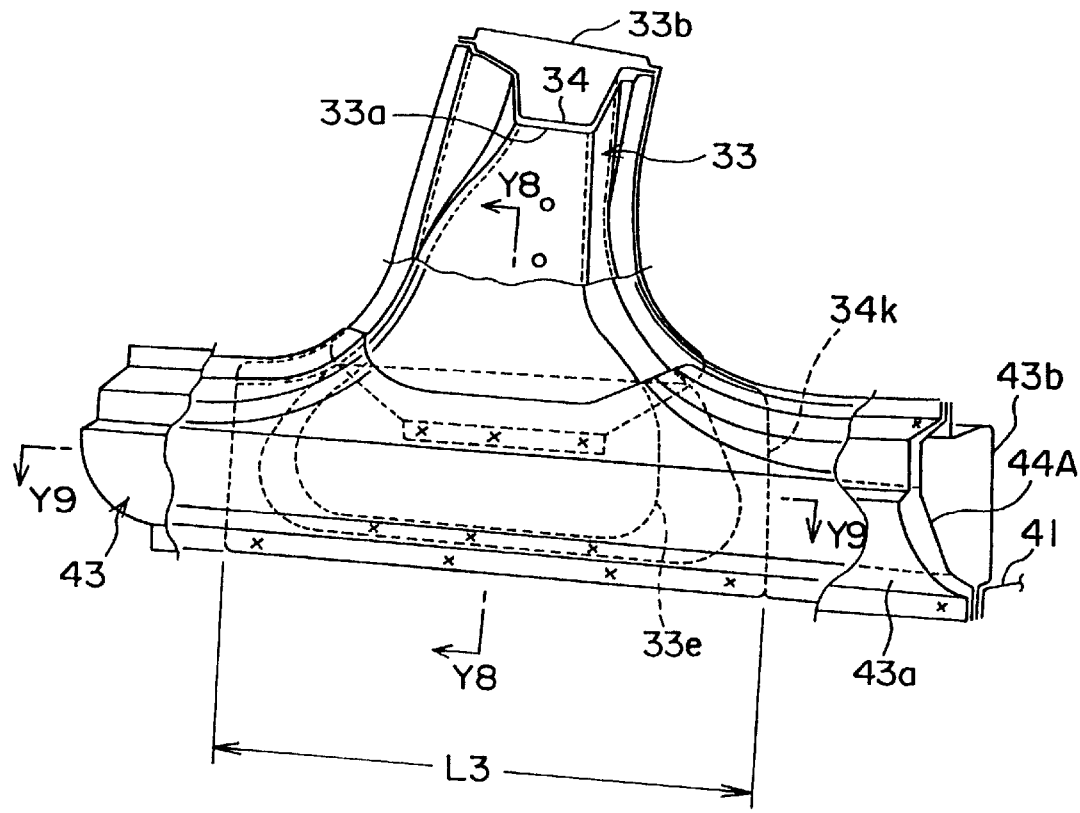
FIG. 36 is a perspective view showing the details of the coupling portion between the side sill and the center pillar.
Figure 37:
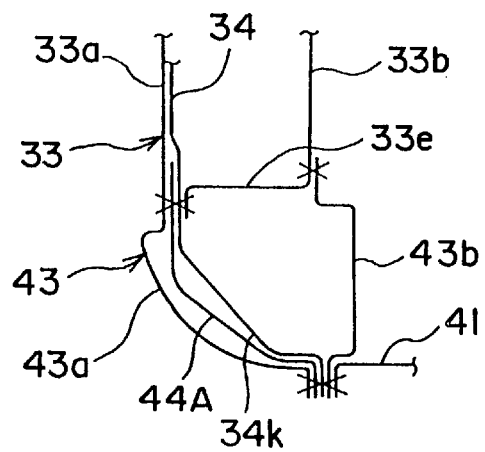
FIG. 37 is an explanatory view in longitudinal cross section taken along the line Y8—Y8 of FIG. 36.
Figure 38:
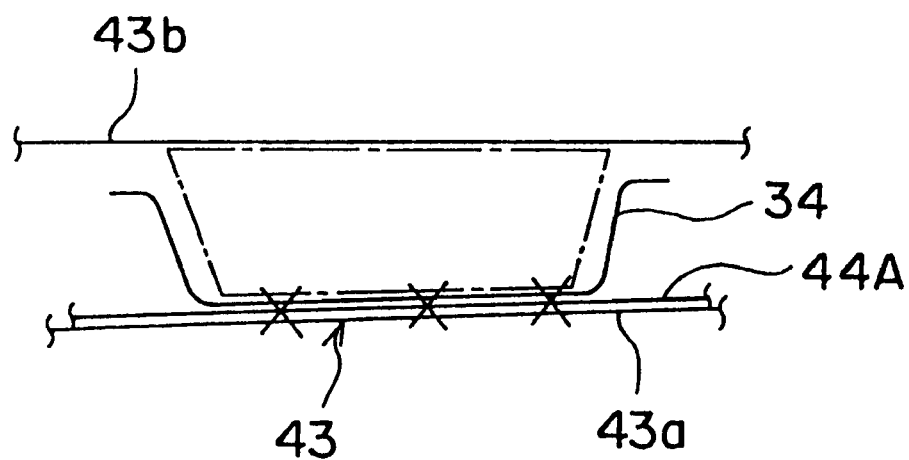
FIG. 38 is an explanatory view in longitudinal cross section taken along the line Y9—Y9 of FIG. 36.

FIG. 36 shows details of the coupling portion between the side sills 43 and the center pillars 33. FIGS. 37 and 38 are explanatory views in cross section taken along the line Y8—Y8 and Y9—Y9, respectively, of FIG. 36. As can be well understood from FIG. 36, on lower end side of the center pillar reinforcement 34, is formed the lower base portion 34k with a length of L3 extending so as to be widespread longitudinally of the car body. Further, as can be understood from FIG. 37, upper portion of the lower base portion 34k is stacked on the inside of the side sill outer 43a and the side-sill-outer reinforcement 44A and joined together by, for example, spot welding.

Further, lower end portion of the lower base portion 34k is sandwiched between lower end portion of the side-sill-outer reinforcement 44A and lower end portion of the side sill inner 43b and then joined together by, for example, spot welding as indicated by X mark.

Furthermore, as can be well understood from FIG. 38, protruding portion of the center pillar reinforcement 34 outward of the lower base portion 34k is stacked on the inside of the side sill outer 43a and the side-sill-outer reinforcement 44A and then joined together by, for example, spot welding as indicated by X mark.

Also, as can be well understood from FIG. 36, lower end side of the center pillar inner panel 33b is bent outward so as to protrude, and a terminal portion of this overhang 33e is further stacked on the overlapping portion of the side sill outer 43a, the side-sill-outer reinforcement 44A and the center pillar reinforcement 34, and then joined together. Further, proximities of the bent portion of the overhang 33e are joined to the upper end portion of the side sill inner 43b by, for example, spot welding as indicated by X mark.

In this way, the reinforcing member 34 (center pillar reinforcement) of the center pillars 33 is coupled to the reinforcing members 44 of the side sills 43 (more specifically, to the side-sill-outer reinforcement 44A). In addition, the reinforcing members 44 of the side sills 43 are set longer in front-side portion extending forward from the joint part with the center pillars 33 than in rear-side portion extending rearward form the joint part with the center pillars 33.

As described above, according to this embodiment, in addition to the advantage that the floor panel in lower part of the automobile interior is supported at its right-and-left side edge portions by the closed-in-cross-section side sills so as to have high stiffness, upper part and right-and-left side portions of the automobile interior, as the vehicle is viewed from the front, are covered with a continuous closed cross section. Therefore, the stiffness around the automobile interior, as the vehicle is viewed from the front, can be effectively enhanced without much increasing the weight of the vehicle body.

Also, an H-shaped (or U-shaped) reinforcing structure, as seen in plan view, can be made up for both roof part of the car body and floor part of the car body, and further, an H-shaped (or U-shaped) reinforcing structure, as seen in plan view, can be made up also for side portions of the car body. Thus, both roof part and floor part of the car body can be further enhanced in stiffness.

As a result, deformation of the automobile interior upon vehicle collisions, especially upon a side collision, can be effectively suppressed, so that protecting performance for passengers in the automobile interior can be further improved.

The front end portion of the side-sill-outer reinforcement 44A placed within the side sills 43 is joined to the lower end portion of the front pillars 31, while the rear end portion thereof is lapped on the side end portion of the No. 3 cross member 47 behind the center pillars 33. Therefore, any side collision load can be effectively supported at three points of the front pillars 31, the center pillars 33 and the No. 3 cross member 47 of strength by taking advantage of side-sill-outer reinforcement 44A set to the length of L1. Thus, cross-sectional deformation of the side sills 43 can be effectively suppressed.

Also, since the side-sill-outer reinforcement 44A is placed on the side sill outer 43a side, any side collision load can be dispersedly transferred directly to the front pillars 31, the center pillars 33 and the cross member 47.

Further, the front end portion of the side-sill-inner reinforcement 44B placed within the side sills 43 is joined to the lower end portion of the front pillars 31, while its rear end portion is provided so as to extend up to the side end portion of the No. 2 cross member 45. As a result, especially any offset collision load can be effectively supported also at the two points of the front pillars 31 and the No. 2 cross member 45 of strength also by making use of the side-sill-inner reinforcement 44B. Thus, cross-sectional deformation of the side sills 43 can be suppressed more effectively.

Also, since the side-sill-inner reinforcement 44B is placed on the side sill inner 43b side, any offset collision load can be dispersedly transferred directly to the front pillars 31 and the No. 2 cross member 45 of strength.

Meanwhile, segment members 16B, 16A are provided within the side sills 43 outside of the No. 2 and No. 3 cross members 45, 47 where the side-sill-outer reinforcement 44A and the side end portion are lapping each other. Therefore, cross-sectional deformation of the side sills 43 can be effectively suppressed by making use of simple plate-shaped segment members 16B, 16A. Thus, any side collision load can be transferred directly to the No. 2 and No. 3 cross members 45, 47 of strength.

Further, the widespread portion 34k in lower part of the center pillar reinforcement 34 is joined to the side sill outer 43a and the side-sill-outer reinforcement 44A, the terminal portion of the bent end portion 33e of the center pillar inner 33b is joined to the joint portion of the side sill outer 43a, the side-sill-outer reinforcement 44A and the center pillar reinforcement 34, and the bent end portion 33e is joined to the side sill inner 43b. Therefore, any side collision load of the center pillars 33 can be dispersedly transferred directly to the side sill outer 43a, the side-sill-outer reinforcement 44A and the side sill inner 43b by making use of the center pillar reinforcement 34 and the center pillar inner 33b. Thus, cross-sectional deformation of the center pillars 33 can be effectively suppressed.

Needless to say, the present invention is not limited to the above-described embodiments and various modifications or design changes may be made without departing from the scope of the present invention.

What is claimed is:

1. A body structure for vehicles comprising;

a body roof equipped with at least one closed-in-cross-section roof reinforcement extending widthwise of the vehicle body along a roof panel, right-and-left end portions of one of the roof reinforcements being coupled to upper end portions of a right-and-left pair of closed-in-cross-section pillar members extending in an upper-and-lower direction in side portions of the vehicle body, respectively, and lower end portions of the pillar members are coupled to a pair of closed-in-cross-section side sills which extend longitudinally of the vehicle body to support right-and left side edge portions of a floor panel, respectively, so that the roof reinforcement, the right-and-left pillar members and the right-and-left side sills form a continuous closed cross section with which an upper portion and right-and-left side portions of the vehicle interior, as viewed from the front of the vehicle, are covered;

a pair of closed-in-cross-section roof side rails extending longitudinally of the vehicle body placed at right-and-left side edge portions of the roof panel to support the side edge portions, the roof side rails, the side sills and the pillar members are each equipped with reinforcing members which extend longitudinally within a relevant closed cross-sectional space to partition the closed cross-sectional space, both right-and-left end sides of the roof reinforcement being coupled to the rein forcing members of the right-and-left roof side rails, respectively, while both upper-and-lower end sides of the reinforcing members of the pillar members are coupled to the reinforcing members of the roof side rails and the reinforcing members of the side sills, respectively, both the reinforcing members of the roof side rails and the reinforcing members of the side sills being provided so as to extend over a generally entire longitudinal length of the vehicle interior;

wherein the right-and-left end positions of the roof reinforcement are coupled to upper end sides of a right-and-left pair of closed-in-cross-section center pillars located between front-and-rear door openings provided at body sides and extending in an upper-and-lower direction, respectively, the reinforcing members of the roof side rails and the reinforcing members of the side sills are set longer in a front-side portion extending forward from a joint part with the center pillar than in a rear-side portion extending rearward from the joint part with the center pillar; and wherein a front end portion of a first side sill reinforcement is joined to a lower end portion of a front pillar and a rear portion of the first side sill reinforcing member is lapped on a side end portion of a first cross member extending widthwise of the vehicle body behind the center pillar, with a front end portion of a second side sill reinforcing member being joined to the lower end portion of the front pillar, while a rear end portion of the second side sill reinforcing member extends at least to the side end portion of a second cross member extending widthwise of the vehicle body in front of the center pillar.

2. The body structure for vehicles according to claim 1, wherein the first side sill reinforcing member is arranged on an outer side in the side sill, and the second side sill reinforcing member is arranged on an inner side in the side sill.

3. The body structure for vehicles according to claim 1, wherein a closed-in-cross-section cross member extending widthwise of the vehicle body and coupling the right-and-left side sills to each other is provided in lower part of the vehicle interior.

4. The body structure for vehicles according to claim 3, further comprising a plurality of the cross members, wherein right-and-left end portions of each cross member are coupled to the reinforcing members of the side sills, respectively.

5. The body structure for vehicles according to claim 4, wherein each of the cross members is provided on the floor panel of the vehicle interior, and a front seat or a rear seat is arranged above each of the cross members.

6. The body structure for vehicles according to claim 4, further comprising a segment member extending widthwise of the vehicle body and lapping on the side end portion of the cross member provided with the side sill.

7. A body structure for vehicles according to claim 1, wherein the roof side rail reinforcing member extending longitudinally of the vehicle body is placed within said closed-in-cross-section roof side rail, and a front end portion of the rood side rail reinforcing member is joined to an upper end portion of said front pillar, while a rear end portion of the roof side rail reinforcing member is located at a position apart a distance from an upper end portion of a rear pillar.

8. The body structure for vehicles according to claim 1, wherein the right-and-left end portions of the roof reinforcement and the upper end portions of the center pillars are coupled to each other, respectively, via a coupling gusset which is installed so as to stretch from inside of the vehicle interior over the coupling portions between the right-and-left end portions of the roof reinforcement and the upper end portions of the center pillars.

9. The body structure for vehicles according to claim 1, wherein the center pillars are each equipped with said plurality of reinforcing members, and wherein a first reinforcing member is provided to couple the roof side rail reinforcing member and the side sill reinforcing member, while a second reinforcing member is provided in a region including a site corresponding to a boundary between said door itself and the door glass opening, and which serves to relax stress concentration at the site corresponding to the boundary when a load is inputted to the center pillar via a door.

10. The body structure for vehicles according to claim 9, wherein the second reinforcing member is constituted so that the stiffness of a portion thereof corresponding to the door glass opening is reduced gradually in upper direction.

11. The body structure for vehicles according to claim 1, wherein a lower portion of the center pillar reinforcement of the center pillar is formed so as to be widespread longitudinally of the vehicle body, the widespread portion being joined to both a side sill outer and a reinforcing member on the side sill outer side, and wherein a lower portion of a center pillar inner is bent outward, a bent end portion thereof being joined to a joint portion between the side sill outer, the reinforcing member of the side sill outer side and the center pillar reinforcement, and the bent portion being joined to the side sill inner.

12. A body structure for vehicles comprising;

a body roof equipped with a plurality of closed-in-cross-section roof reinforcements extending widthwise of the vehicle body along a roof panel, right-and-left end portions of a first roof reinforcement being coupled to upper end portions of a right-and-left pair of closed-in-cross-section center pillars located between front-and-rear door openings provided at body sides and extending vertically, and a second roof reinforcement being coupled to upper end portions of a right-and-left pair of closed-in-cross-section front pillars extending vertically along a front edge of the front door opening, while lower end portions of the front pillars and the center pillars are coupled to a pair of closed-in-cross-section side sills which extend longitudinally of the vehicle body to support right-and-left side edge portions of a floor panel, and a pair of closed-in-cross-section roof side rails extending longitudinally of the vehicle body are placed at right-and-left side edge portions of the roof panel to support the side edge portions, wherein the roof side rails, the side sills and the pillar members are each equipped with reinforcing members which extend longitudinally within a relevant closed cross-sectional space to partition the closed cross-sectional space, and wherein the reinforcing members of the roof side rails and the reinforcing members of the side sills are set longer in front-side portion extending forward from the joint part with the center pillar than in rear-side portion extending rearward from the joint part with the center pillar; and wherein a front end portion of a first side sill reinforcing member is joined to a lower end portion of said front pillar and a rear portion of the first side sill reinforcing member is lapped on a side end portion of a first cross member extending widthwise of the vehicle body behind the center pillar, while a front end portion of a second side sill reinforcing member is joined to the lower end portion of the front pillar, while a rear end portion of the second side sill reinforcing member extends at least to the side end portion of a second cross member extending widthwise of the vehicle body in front of the center pillar.

13. The body structure for vehicles according to claim 12, wherein the first side sill reinforcing member is arranged on the outer side in the side sill, and the second side sill reinforcing member is arranged on the inner side in the side sill.

* * * * *